United States Patent
Ho et al.

(10) Patent No.: US 7,386,804 B2
(45) Date of Patent: Jun. 10, 2008

(54) METHOD, SYSTEM, APPARATUS, AND COMPUTER PROGRAM PRODUCT FOR CONTROLLING AND BROWSING A VIRTUAL BOOK

(75) Inventors: Seng Beng Ho, Singapore (SG); Chee Cheng Jeffrey Liang, Singapore (SG); Jason Bradley Austin, Oakley (AU)

(73) Assignee: E-Book Systems Pte. Ltd., Singapore (SG)

( * ) Notice: Subject to any disclaimer, the term of this patent is extended or adjusted under 35 U.S.C. 154(b) by 504 days.

(21) Appl. No.: 10/661,599

(22) Filed: Sep. 15, 2003

(65) Prior Publication Data

US 2004/0164975 A1     Aug. 26, 2004

Related U.S. Application Data

(60) Provisional application No. 60/410,278, filed on Sep. 13, 2002.

(51) Int. Cl.
*G06F 3/048* (2006.01)
*G06F 3/00* (2006.01)
*G06F 15/177* (2006.01)
*G06T 13/00* (2006.01)

(52) U.S. Cl. ............... 715/776; 715/700; 715/739; 345/901; 345/473

(58) Field of Classification Search ........... 715/700, 715/739, 776; 345/901, 473
See application file for complete search history.

(56) References Cited

U.S. PATENT DOCUMENTS 5,463,725 A * 10/1995 Henckel et al. ............ 715/776
5,909,207 A * 6/1999 Ho ............................. 345/156
6,009,459 A * 12/1999 Belfiore et al. ............ 709/203
6,028,603 A    2/2000 Wang et al.
6,064,384 A * 5/2000 Ho ............................. 715/839

(Continued)

OTHER PUBLICATIONS

Microsoft Windows Power Point☐☐Copyright 1987-1999☐☐Screendumbs.*
Virtual Album☐☐Radar Software Inc☐☐Copyright 2001☐☐www.radar.software.com/valbum☐☐.*
Microsoft PowerPoint 2000☐☐Copyright 1987-1999☐☐Screen prints.*

(Continued)

*Primary Examiner*—William L. Bashore
*Assistant Examiner*—Andrea N Long
(74) *Attorney, Agent, or Firm*—Oblon, Spivak, McClelland, Maier & Neustadt, P.C.

(57) ABSTRACT

A hardware and software system including a controller that can be operatively combined with several methods of display on a display screen under software and hardware control for the purpose of browsing through data stored in a memory device. The browsing of the data stored in a memory device is facilitated in such a way that it allows a rapid view of what contents are present and the organization of the material in the data, as well as rapid access to the items in the data involved. The controllers in the system have specialized functions for effecting various actions on the data displayed on the display screen in such a way that users can rapidly browse through the data involved. The methods of display may include interaction with CD-R, CD-RW, DVD, a portable optical large volume storage disk, a portable large volume non-optical storage medium, a TV, and an HDTV.

86 Claims, 36 Drawing Sheets

U.S. PATENT DOCUMENTS

| | | | |
|---|---|---|---|
| 6,229,502 | B1 | 5/2001 | Schwab |
| 6,486,895 | B1 | 11/2002 | Robertson et al. |
| 7,071,915 | B2 * | 7/2006 | Liang et al. ................ 345/156 |
| 2002/0090934 | A1 * | 7/2002 | Mitchelmore ............... 455/412 |
| 2002/0120635 | A1 * | 8/2002 | Joao ........................... 707/200 |
| 2002/0184189 | A1 * | 12/2002 | Hay et al. ....................... 707/1 |
| 2003/0210226 | A1 | 11/2003 | Ho et al. |

OTHER PUBLICATIONS

Page Flipping Tutorial, NewTek Forum: LightWave Techniques and Tips, Feb. 3, 2002, <http://www.newtek.com/discus/messages/2/16991.html>, pp. 1-5.*

* cited by examiner

BASIC AND COMPLEX FLIPPING ACTIONS
1901 Direction of Movement
1902 Speed of Movement
1903 Select to Jump to a Specified Point in Document
1904 Jump to a Specified Point in Document
1905 Permanent Bookmarking
1906 Finger Bookmarking
1907 Launch a Single Flipping Page
1908 Launch Multiple Flipping Pages at a Specific Interval (Speed)
1909 Reverse Direction of Last Trailing Page ("Opening Up")
1910 Reverse Direction of Last N Trailing Pages ("Opening Up")
1911 Reverse Direction of Any Selected Group of Flipping Pages ("Opening Up")
1912 Freeze One or More Than One Flipping Pages in Mid-flip
1913 Unfreeze Frozen Pages and Let Pages Continue to Flip in Directions Prior to Freezing
1914 Unfreeze Frozen Pages and Let Pages All Flip in the Same Direction
1915 Unfreeze Frozen Pages and Some Pages Flip to Left Side and Some to Right Side of Book
1916 Unfreeze Frozen Pages and Let Subgroups of Pages Flip in Different Directions
1917 Jump and Make a Thick Collection of Pages Flip Together
1918 Launch Flipping Pages While Thick Collection of Pages is Flipping
1919 Launch One or More Other Thick Collections of Pages While Other Pages are Flipping
1920 Select to Hold a Page
1921 Move Held Single Page in Any Desired Direction at Desired Speed
1922 Select to Hold a Thick Collection of Pages
1923 Move Held Single Thick Collection of Pages in Any Desired Direction and Speed
1924 Select to Hold More Than One Page or Thick Collection of Pages
1925 Move Held Pages and Thick Collections of Pages in Any Desired Direction and Speed
1926 Hold a Single Page in Mid-flip and Collect Other Pages That Flip Onto It
1927 Hold a Single Thick Collection of Pages in Mid-flip and Collect Other Pages That Flip Onto It
1928 Hold a Single Page or a Thick Collection of Pages in Mid-flip and Execute All (All the Above as well as This) Page Flipping Actions Between it and One of the Thicknesses on the Side of the Book
1929 Hold Any Two Pages or Thick Collections of Pages in Mid-flip and Execute All (All the Above as well as This) Page Flipping Actions Between Them
1930 Hold a Single Thick Collection of Pages in Mid-flip While Releasing One or More Pages from the Collection
1931 Select a Desired Split Point on a Held Single Thick Collection of Pages in Mid-flip and Split the Collection of Pages into Two Separate Collections of Pages

FIG. 12

METHOD, SYSTEM, APPARATUS, AND COMPUTER PROGRAM PRODUCT FOR CONTROLLING AND BROWSING A VIRTUAL BOOK

CROSS REFERENCE TO RELATED PATENT DOCUMENT

This application claims priority to U.S. provisional application 60/410,278 filed on Sep. 13, 2002. This application is related to U.S. Pat. No. 5,909,207; U.S. Pat. No. 6,064,384; U.S. Pat. No. 6,407,757; U.S. Pat. No. 6,340,980; U.S. patent application Ser. No. 09/617,043 filed Jul. 14, 2000; and allowed U.S. patent application Ser. No. 09/686,902 filed Oct. 12, 2000; and allowed U.S. patent application Ser. No. 09/686,965 filed Oct. 12, 2000; U.S. patent application Ser. No. 60/318,638 filed Sep. 13, 2001; U.S. patent application Ser. No. 10/029,718 filed Jan. 23, 2001; U.S. patent application Ser. No. 10/029,868 filed Dec. 13, 2001; U.S. patent application Ser. No. 10/142,996 filed May 13, 2002; U.S. patent application Ser. No. 10/142,858 filed May 13, 2002; U.S. patent application Ser. No. 10/143,005 filed May 13, 2002; U.S. patent application Ser. No. 60/365,186 filed Mar. 19, 2002; and U.S. patent application Ser. No. 60/367,765 filed Mar. 28, 2002 the entire contents of each of these applications being incorporated herein by reference.

BACKGROUND OF THE INVENTION

1. Field of the Invention

The present invention relates to a hardware and software system including a controller that can be operatively combined with several methods of display on a display screen under software and hardware control for the purpose of browsing through data stored in a memory device. This facilitates the browsing of the data stored in a memory device in such a way that it allows a rapid view of what contents are present and the organization of the material in the data, as well as rapid access to the items in the data involved. Specifically the present invention relates to controllers that have specialized functions for effecting various actions on the data displayed on the display screen in such a way that users can rapidly browse through the data involved.

2. Description of the Prior Art

Currently, the method for viewing documents stored in a virtual is through a virtual monitor screen. For documents that are longer/larger than can be contained within one screen, a means is provided to scroll the document up and down or to jump to a particular point in the document (through the use of, for example, a "mouse" coupled with scroll bars at the edges of the document displayed on the screen or through the use of hypertext links).

However, most people do not find this a particularly convenient way to view a document, as compared with a book. That this is true is evidenced in the fact that despite the fact that the virtual has been in increasing use, there is not only no corresponding reduction in paper use, but an increase in paper quantity is required to print what is conveniently stored in a virtual that can be seemingly easily and flexibly manipulated for viewing. Sometimes the printed version of the information involved is necessary, like in the case of printing a picture on a sheet of paper to be pasted on some surface (e.g., a wall), or in the case of the convenience of having a relatively light, hardy paperback book for reading in almost any possible situation and location, but there are times when a reader is quite happy to sit at a desk in front of a desktop virtual or handle a notebook virtual away from the desk, and yet the reader would still prefer a printed version of the document in a hand-held format. This is especially true in the case of looking through manuals, including software manuals, to understand how to operate a device or software application. The irony is that virtual software packages usually come with thick and heavy manuals containing information which can easily be stored on a light-weight CD-ROM, and even if the manuals are sometimes dispensed in the form of a CD-ROM, more often than not people would print them out into a hard-copy format in order to facilitate reading.

What is involved when one interacts with the printed material in a book is a subtle and complicated process. To start with, material in a book is presented in a sequential order, with a continuity of material from page to page, and there is also a hierarchical structure in the material presented (as the material is organized into chapters, sections, subsections, etc.) because ideas in the material are related to each other in some kind of conceptual hierarchy. The human perceptual system inputs data in a sequential manner, and after a book is read from the beginning to the end in a sequential fashion, the brain then recreates the conceptual hierarchy after viewing the material involved. However, very often one does not read a book (or input the material involved) from the beginning to the end because (a) one wants to have an overview of the material present; (b) one is searching for something of interest to him/her; or (c) one is interested in reading only portions of the book (in the case of, say, reading the manual to understand how to operate something). In these cases, one browses through the subject book to find the material of unique interest to that reader.

Two basic things are achieved in the browsing process. First, the browser has a glimpse of what are the contents of the book document. Second, the browser has an idea of approximately where the items of interest are so that the browser can (a) return to look for them later when needed, and (b) have an understanding of the relationships between the material currently being viewed and other material (i.e., an understanding of the hierarchical structure involved). When browsing a book document, many finger-operations are required of the browser in order to flip through the pages and, together with the inherent sequential order imposed by the pages, very quickly allow the browser to have an understanding of the nature, location and organization of the material involved.

In the process of browsing through a book, one can perform the following operations:
 (a) flip through the pages at varying speeds depending on the level of detail at which one wishes to view the material in the book;
 (b) jump to the approximate location of the item of interest;
 (c) change the direction of flipping (forward or backward) very rapidly because
  (i) one would like to compare and contrast material on different pages,
  (ii) after jumping to an approximate location of some items of interest one would like to find their exact locations, or
  (iii) one is unsure of where the item of interest is and is in the process of searching for it; and
 (d) mark the locations of some pages of interest that one may want to later return.

All these operations are performed very rapidly with the fingers interacting with the flipping pages and with minimal unnecessary movements of the fingers and hands. Interestingly, a book/magazine with soft and flexible pages is harder to handle because more finger and hand movements are needed to browse through it, while books with stiff pages can be browsed with almost no movement of the hand.

In currently available methods of browsing through documents stored in a virtual, e.g., the use of a mouse combined with scroll bars and buttons on the virtual screen, more movements of the hands are necessary to effect the various operations described above. Also, fine control of the hand or fingers (depending on whether the mouse uses hand movement to move the cursor on the screen or finger movement like in the case of a track ball) is necessary to position the cursor on the screen at the required places. The process is both lengthy and clumsy. The lengthiness of the process taxes the human short term memory s ability to remember items encountered in the recent past for the purpose of establishing the relationships between items and the clumsiness of the process creates distraction and interferes with the short term memory process, a well known effect in perceptual psychology.

Because material in a book is organized into pages, it also enhances the ability of the reader to better remember the location of various portions of the material involved. Also, unlike the process of scrolling through a document on a screen like what is normally done in a word-processor, wherein the contents become a blur and reading is impossible, when one moves through the material in a book through flipping, one is still able to read at least the approximate contents, if not the details. It is due to these features that a person browsing through a book can acquire a good understanding of its contents, the location of specific items and organization of the material.

It is because of the reasons set forth above, people still prefer to read a book in their hands, rather than a document image displayed on a virtual screen using currently available methods.

U.S. Pat. No. 5,467,102 (Kuno et al.) discloses a device for document viewing that consists of two display screens. One of the purposes of using two display screens is to allow the user to display two different pages from the document so that they can be read side-by-side (e.g., a diagram and its textual explanation). Another purpose is to allow a large picture to be displayed simultaneously on both pages. The Kuno et al. device allows users to change the speed of movement through the document through a pressure sensor—the more pressure applied, the faster the pages in the document are moved through. The Kuno et al. device also allows the document to be viewed in the forward or backward direction by pressing on a forward sensor area or a reverse sensor area respectively. One can also select a page to jump to by pressing on an icon displayed on the screen. However the Kuno et al. device still does not provide the same convenience as browsing through a book, primarily because when switching between the operations for different controls—the speed of movement through the document, the change of direction of viewing, and the jumping to different parts of the document—there are a lot more hand and finger movements than is the case in manipulating a physical book. Moreover, the Kuno et al. device is a specialized, relatively costly device with sensors and hardware built onto two display screens, whereas the present inventor recognizes that a lower cost and more practical device would be one that adds modularly to the existing virtual system.

Currently, there are also virtual mice that can eliminate the above-mentioned problem of positioning cursor on the virtual screen with a conventional mouse (i.e., fine control of the hand or fingers is needed). These mice allow the user to specify "hot locations" on the screen on which the cursor "homes onto" with less fine control than conventional mice. Furthermore, a subset of these mice can generate "vertical only" or "horizontal only" movement of the cursor so that the scrolling process requires less fine control of the muscle than is required with a conventional mouse. These mice eliminate some, but not all, of the problems associated with the conventional methods of virtual input as far as virtual-based document browsing is concerned.

In U.S. Pat. No. 5,417,575 (1995) McTaggart discloses an electronic book that comprises laminated sheets bound together in the form of a book. On each of these sheets, printed material is arranged on the top layer and below that layer is an electronic backdrop containing thin light-emitting diodes (LED's) and pressure sensitive switches affixed onto a backing sheet. The LED's generate visual signals that can be seen through the top layer for the purpose of highlighting parts of the printed material. The pressure switches, positioned under certain items in the printed material, are for the purpose of sensing the user's selection of those items. A speaker is also provided on the book to generate audio signals for explaining the text or giving the user audio feedback. Contact or photo-sensitive switches are also embedded in the pages to allow the electronic circuits to know which pages are currently being viewed, so that the appropriate audio and visual signals can be generated. Even though this apparatus is in a form that allows a person to handle it like handling a typical book, with visual and audio enhancements of the printed material as well as facilities that accept the user's feedback, it is basically a hard-wired device that is not reprogrammable and different hardware has to be configured for books with different contents. No provision is available for downloading document files from a virtual for display on the electronic book nor is the electronic book able to display any arbitrary document file. This device is hence not suitable for browsing through documents stored in a virtual.

U.S. Pat. No. 5,909,207 (Ho) discloses a virtual-based system that allows users to view and manipulate documents in the form of an electronic virtual book that addresses the above problems in browsing information in the electronic medium. This virtual book system simulates the paper book very closely and has two major components. One is the representation of the paper book on the virtual screen, complete with realistic flipping pages and thickness representation. The other is the use of a browsing device that allows 1. rapid change of direction of flipping,
2. rapid change of speed of flipping,
3. selection and jumping to any desired page, and
4. bookmarking of the pages.

The browsing device allows one to use the fingers to manipulate the pages in the book much in the same way as in the case of the paper book. Therefore, the virtual manipulation of the pages together with the book image on the screen constitutes a virtual book system. This virtual book system improves on the methods used in current electronic means of information browsing in a very significant way such that the ease of browsing information can approach that obtainable with a paper book. This allows users to be able to quickly browse through a large number of pages (perhaps thousands of pages) of information and obtain the idea of the structure and contents involved and hence a good overview of the entire collection of material in the "virtual book". Other than being able to have a good idea of the structure and contents of the material involved, the process of browsing through the material presented in the form of a virtual book much like in the case of the paper book also facilitates subsequent searches for items in the material.

In U.S. Pat. No. 5,909,207 (Ho) the virtual book browsing device basically consists of a pressure and position sensor. The pressure the finger exerts on the pressure sensor controls the speed of flipping through the pages of the virtual book. The movement of the finger on the position sensor on the browsing device in the virtual book system corresponds to the movement of the finger on the thickness of the paper book to select a page to jump to. The combination of the pressure and position sensor therefore allows one to rapidly browse through the virtual book.

However, the method of presenting and browsing information described in U.S. Pat. No. 5,909,207 (Ho) can be improved further by putting together the various components of the system into an integrated system with simple, one-button operations for most of the desired functions. This will greatly improve the consumer use of the system.

Therefore, the inventor has identified there exists a need for a specialized system for presenting the virtual book system for a consumer-oriented market. In particular, there is a need for a specialized system for presenting the virtual book system that can be interfaced to a computer, a regular or widescreen television (TV), or a regular or widescreen high definition television (HDTV). There is also a need to interface a virtual book system with a CD-R, CD-RW, a DVD, and a similar optical/non-optical portable large volume storage disk or non-disk medium.

SUMMARY OF THE INVENTION

In view of the aforementioned short-comings of presently available schemes for providing consumers with a one-button, simple operations for effecting various desired actions on a virtual book system, such as controlling and browsing a virtual book, one objective of the present invention is to provide a memory and control device to provide one button operations for data transfer and display operations.

Another objective of the present invention is to provide a controller that works with the memory and control device for the purpose of effectively and rapidly control and browse a virtual book on a virtual book system.

Yet another objective of the invention is that the positioning and design of the controls for the operations performed by the fingers on the controller are such that they allow minimal movements of the fingers, thus maximizing the ease of browsing through the displayed virtual book. The dexterity of the human fingers is to be fully exploited for these controls.

Each of these objectives include the objective to display on a computer, a regular or widescreen television (TV), or a regular or widescreen high definition television (HDTV) and/or to interface with a CD-R, CD-RW, a DVD, and a similar optical/non-optical portable large volume storage disk or non-disk medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 12 is a list of the basic and complex flipping actions.

FIG. 18 is the menu for selecting folders on memory sources to operate on.

FIG. 19 is another menu for selecting folders on memory sources to operate on.

DESCRIPTION OF THE PREFERRED EMBODIMENTS

Figure 1A:
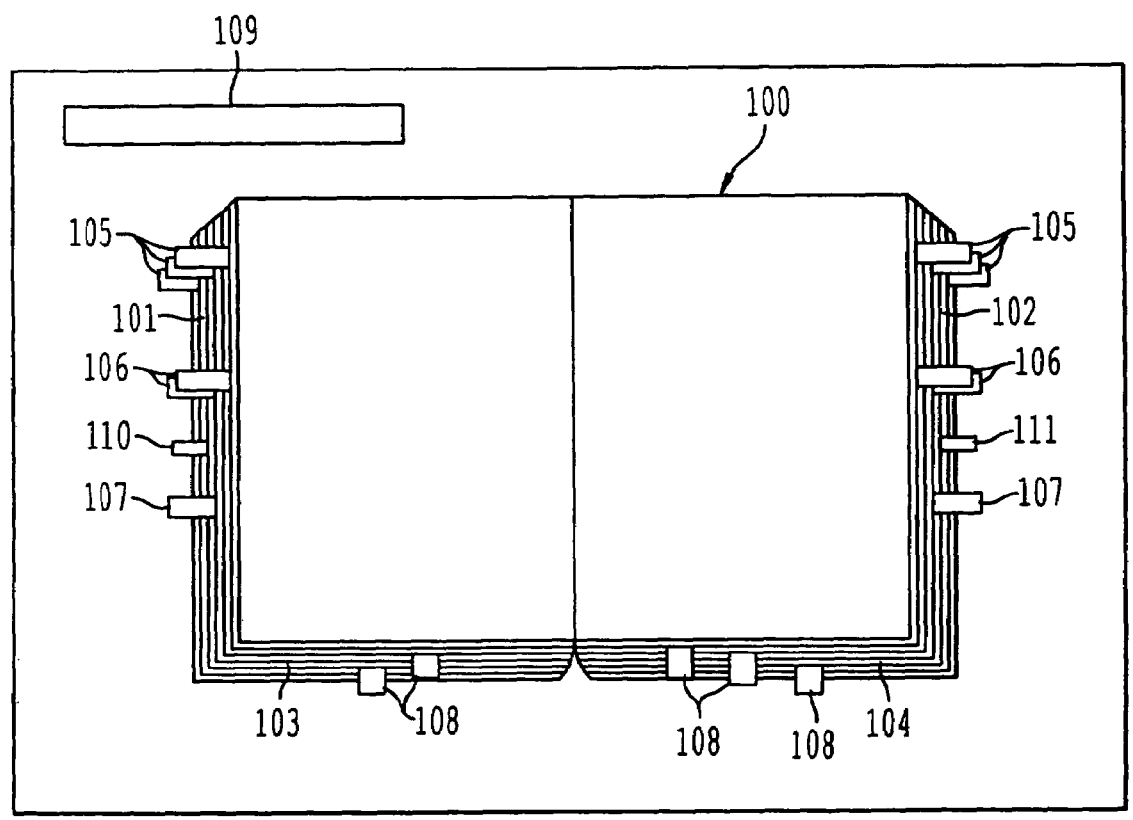
FIG. 1A is a top perspective view of the virtual book displayed on the display screen that is used to display information from a memory and control device.

Referring now to the drawings, wherein like reference numerals designate identical or corresponding parts throughout the several views, and more particularly to FIG. 1A thereof which depicts one embodiment of the virtual book interface. Basically, the information is displayed on two pages as in an opened book. At this stage, a number of pages have been browsed through and collected in the "virtual book" 100. The amount of material before and after the current pages (the pages in view) is shown as varying thicknesses on the left and right sides (101 and 102), respectively (as well as the left and right bottom edges (103 and 104)), of the book. On the left and right thicknesses (101 and 102) are shown a number of bookmarks (105-107) that bookmark some of the pages that have been viewed earlier. There are three types of bookmarks on these thicknesses. They are page-bookmarks 105, annotation bookmarks 106, and finger bookmarks 107. On the bottom thicknesses (103 and 104) are shown a number of keyword bookmarks 108. An Internet URL (Universal Resource Locator) field 109 above the virtual book 100 allows URL addresses to be entered.

In order to allow the user to select any desired page, jump cursors 110 and 111 are provided on the left and right thickness (101 and 102). The user, using a mouse or other control, can move the left or right jump cursors (110 and 111 respectively) up and down the left or right thicknesses (101 and 102 respectively). The page number may appear on the tag of the jump cursor to display the page selected by the jump cursor. When the user has decided to jump to a certain page using the jump cursor to select that page, he/she can use the mouse or other input device to activate the jump.

Figure 1B:
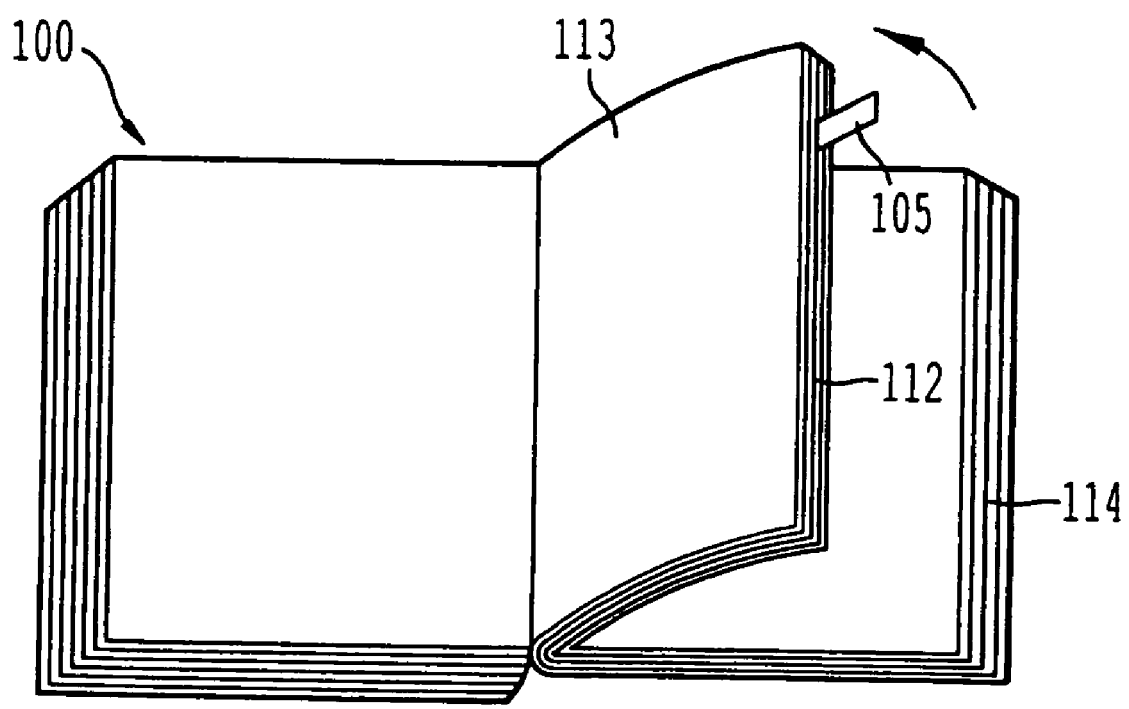
FIG. 1B is a top perspective view of the virtual book displayed on the display screen in the process of jumping to a number of pages ahead in the book.

FIG. 1B depicts the process by which a certain selected page in the virtual book 100 is jumped to. This jump may have been either activated by the selection of a bookmark (e.g. page-bookmark 105) or by the jump cursor (e.g., jump cursor 110 or 111). The thickness 112 between the page originally in view 113 and the page jumped to 114 is shown to move across the virtual screen in continuous animation, much like in the case of the physical book.

Figure 1C:
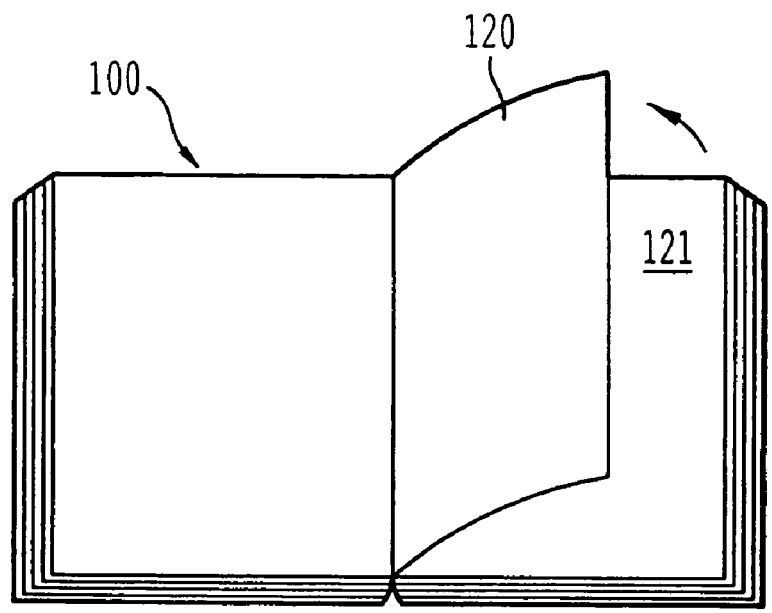
FIG. 1C is a top perspective view of the virtual book displayed on the display screen in the process of flipping to the next page.

FIG. 1C depicts a process by which one page 120 in the virtual book 100 is being flipped. The page 120 can be shown to bend and move across the virtual screen to reveal the underlying page 121.

Figure 1D:
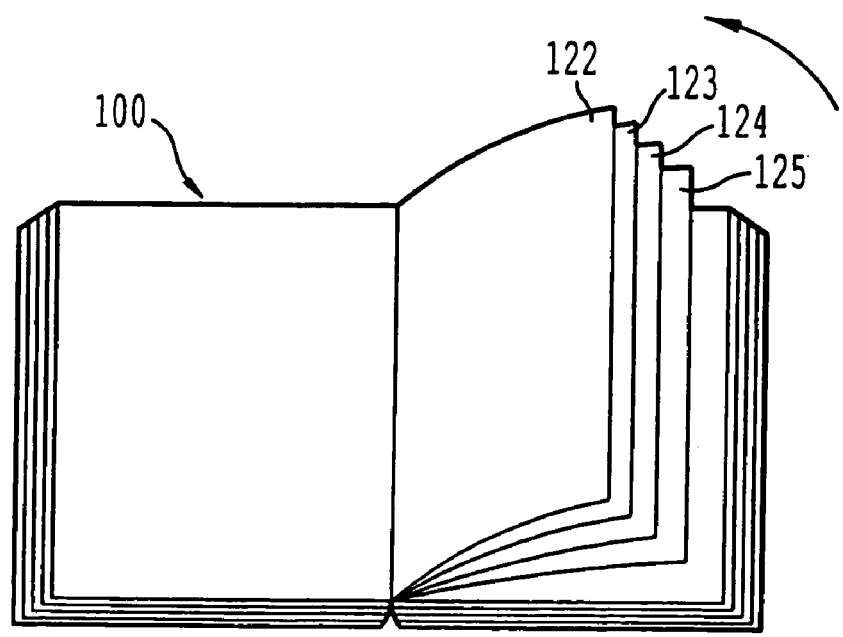
FIG. 1D is a top perspective view of the virtual book displayed on the display screen in the process of flipping many pages simultaneously.

FIG. 1D depicts a process by which, because of increased speed of moving through the virtual book 100 by flipping the pages, more than one page (122-125) is shown to be moving across the virtual screen at the same time. The user can select to freeze all the pages in motion.

Figure 1E:
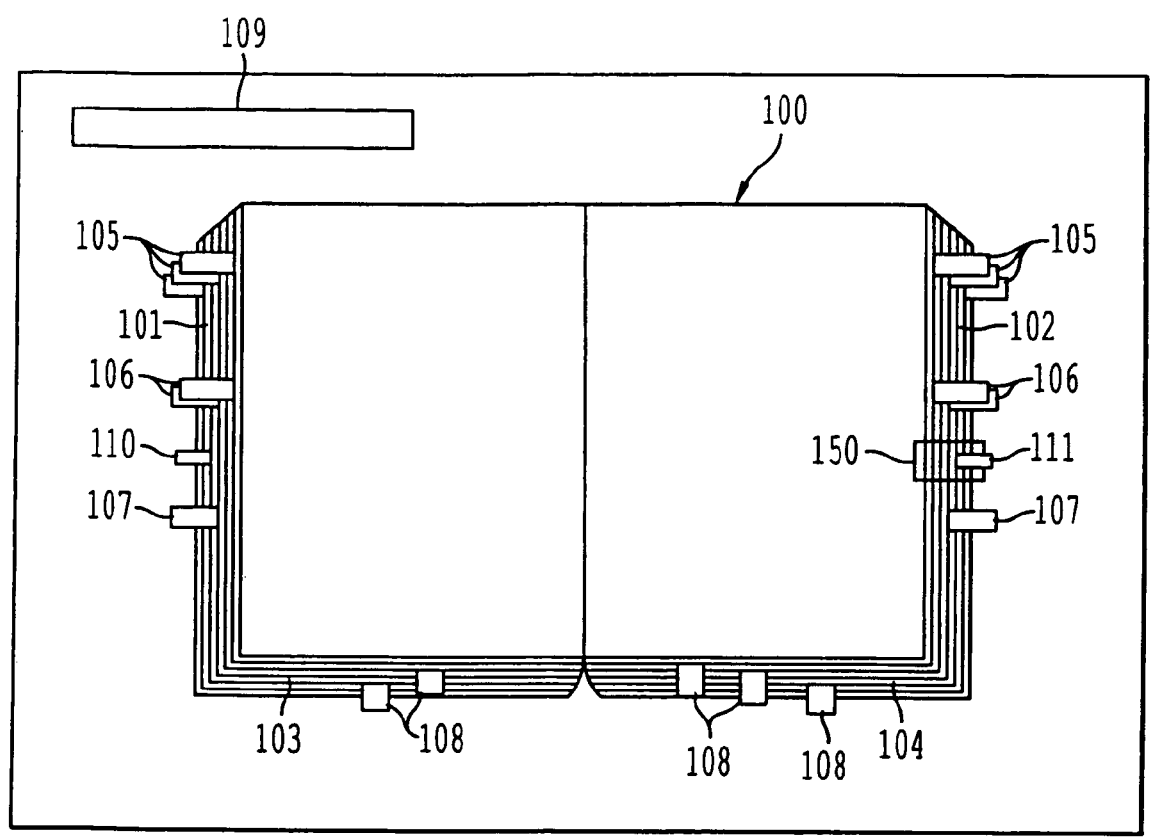
FIG. 1E is a top perspective view of the exemplary virtual book displayed on the display screen during the process of selecting a page where the thickness is expanded to allow finer resolution during page selection.

FIG. 1E depicts a special jump cursor mode in which the thickness of the page in the region of the jump cursor (110 or 111) is selected to enter a mode of fine adjustment. Due to the resolution of the screen, if the thickness of the page (101 or 102) is used to represent, say, a large number of pages while the thickness representation on the virtual screen may only have a limited number of pixels, the movement of the jump cursor (110 or 111) over the thickness (101 or 102 respectively) in pixel-incremented steps may not allow the user to select some of the pages. Therefore, a fine adjustment mode is necessary. One embodiment is to right click on the jump cursor (say jump cursor 111), and the thickness region around the jump cursor 111 is "expanded" and represented as a rectangle 150. The thickness represented in the rectangle 150 represents a subset of the pages represented by the full thickness 102, around the page currently pointed to by the jump cursor 111. When the jump cursor 111 is moved up and down the thickness within the rectangle 150, it can access the pages to a finer level than on the original thickness 102. Further "enlargements" of the thickness 102 is also possible that leads to even finer access of the pages on the thickness 102.

Figure 2:
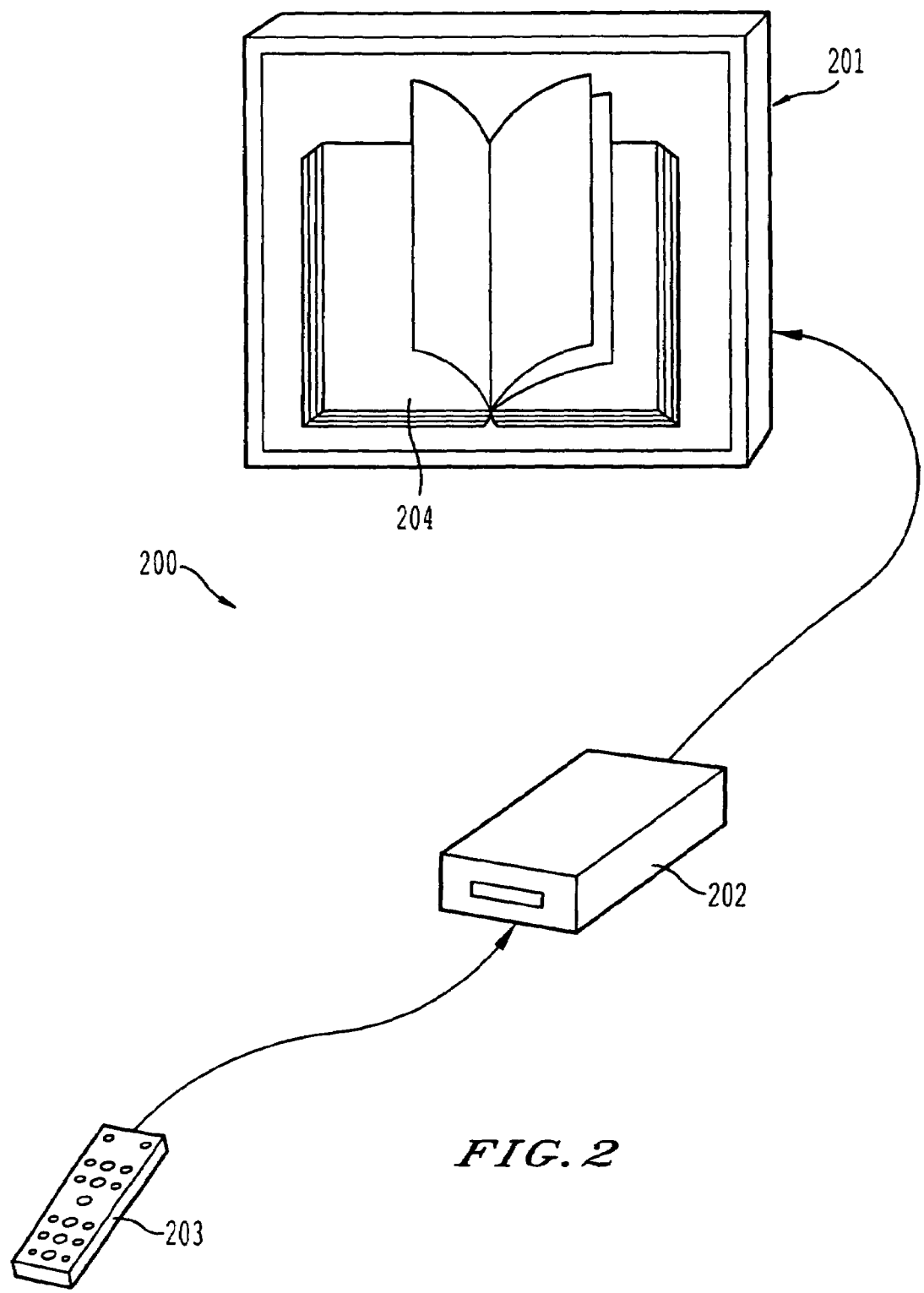
FIG. 2 is a front perspective view of a virtual book display and control system in which there are three main components: a display screen, a memory and control device and a controller.

FIG. 2 depicts an embodiment of a system 200 targeted toward a general consumer market. The system 200 consists of a display screen 201, a memory and control device 202, and a controller 203. The display screen 201 can be a computer screen, a TV screen or any other kind of display screen. The device 200 can be a computer-based system or any other kind of system that generates on command a virtual book interface on the display screen 201 to display information in the virtual book format 204. The controller 203 can be a mouse, a keyboard, a custom (wireless or wire-connected) remote controller, or any other kind of input device that generates the necessary signals to the device 202 to generate the necessary images in the display screen (e.g., a TV or DVD remote controller).

Figure 3A:
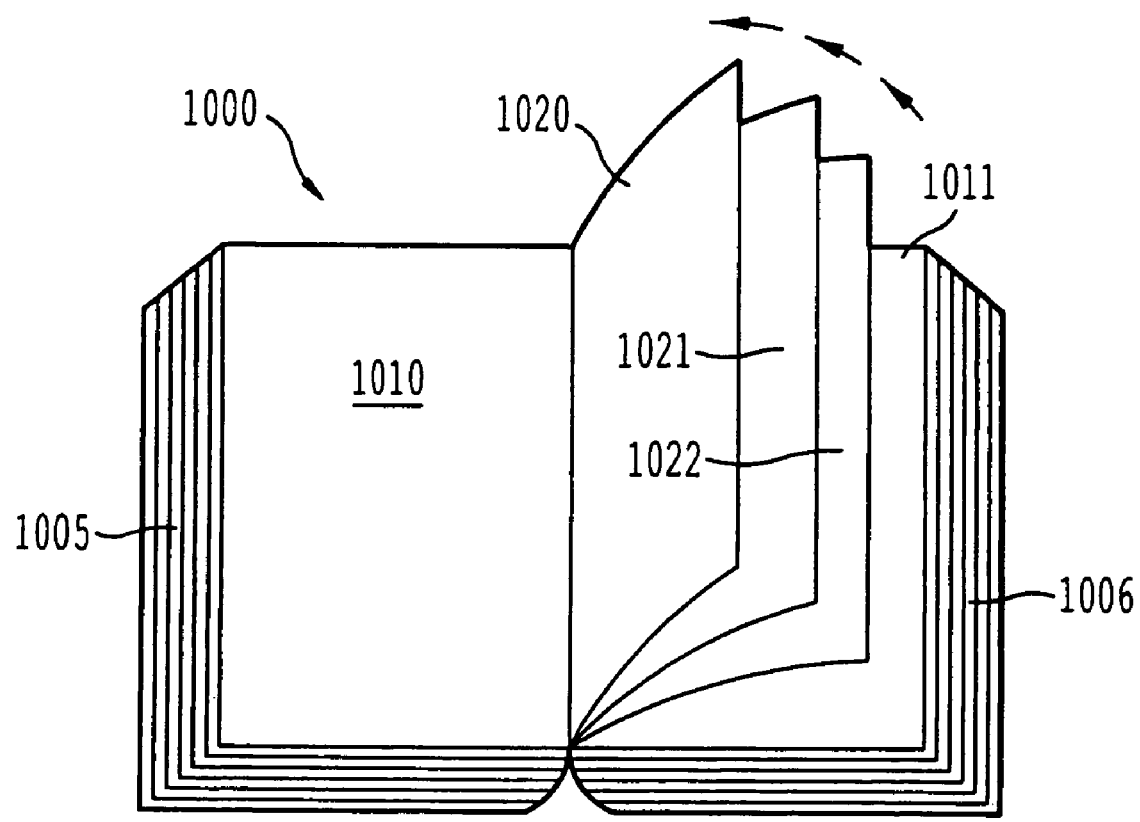
FIG. 3A is a top perspective view of a virtual book showing the basic flipping process.

FIG. 3A depicts the basic flipping mechanisms of a virtual book 1000 on a computer screen. A left page 1010 and a right page 1011 are stationary while three pages 1020, 1021, and 1022 are being flipped across from the right side to the left side simultaneously. The faster the movement through the book, the more pages are flipped simultaneously and vice versa. (At the minimum, one page can be flipping across.) The speed of movement through the virtual book 1000 is also proportional to the speed of movement of each flipping page while it flips from the right to the left side of the virtual book 1000 or vice versa. When the flipping pages 1020, 1021, and 1022 reach the left side of the virtual book 1000, they are collected there, forming part of the left side of the virtual book 1000. The thicknesses 1005 and 1006 on both sides of the virtual book change accordingly as a result of disappearance of pages from or accumulation of pages on the corresponding side.

Figure 3B:
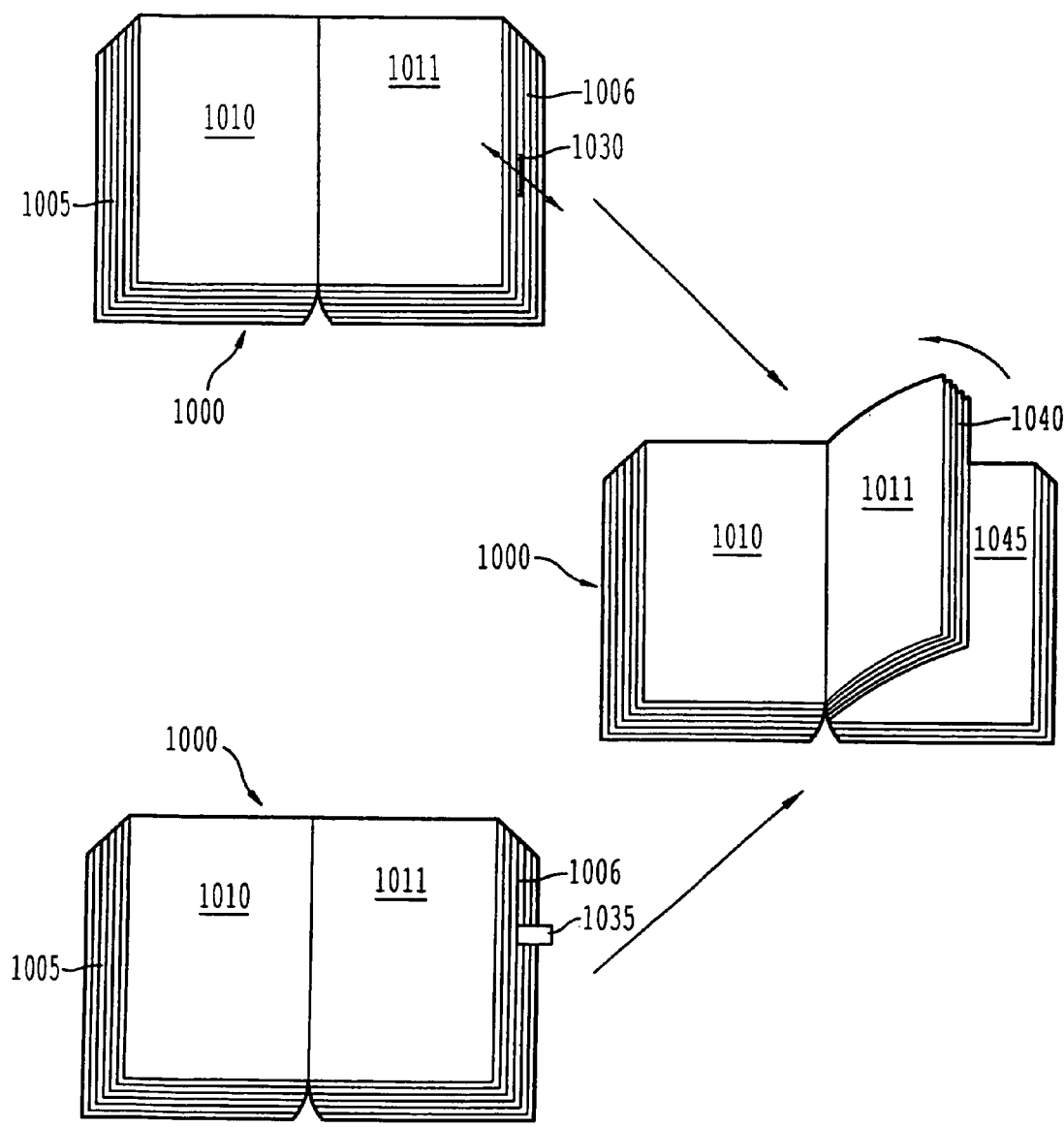
FIG. 3B is a top perspective views of a few virtual books showing the process of jumping to a selected page.

FIG. 3B depicts the basic jumping mechanism as a result of either an activation of a jump cursor 1030 on the right side thickness 1006 or a bookmark 1035 on the right side thickness 1006. A collection of pages between the current right-hand page 1011 and the page 1045 to jump to is shown to flip across from the right side to the left side of the virtual book 1000. A thickness 1040 proportional to the number of pages in between the right-hand page 1011 and the page 1045 to jump to is shown moving across the virtual book 1000 accordingly.

FIGS. 4-11 depict more complex flipping actions of the pages as a result of receiving browsing control commands to be described in detail later.

Figure 4A:
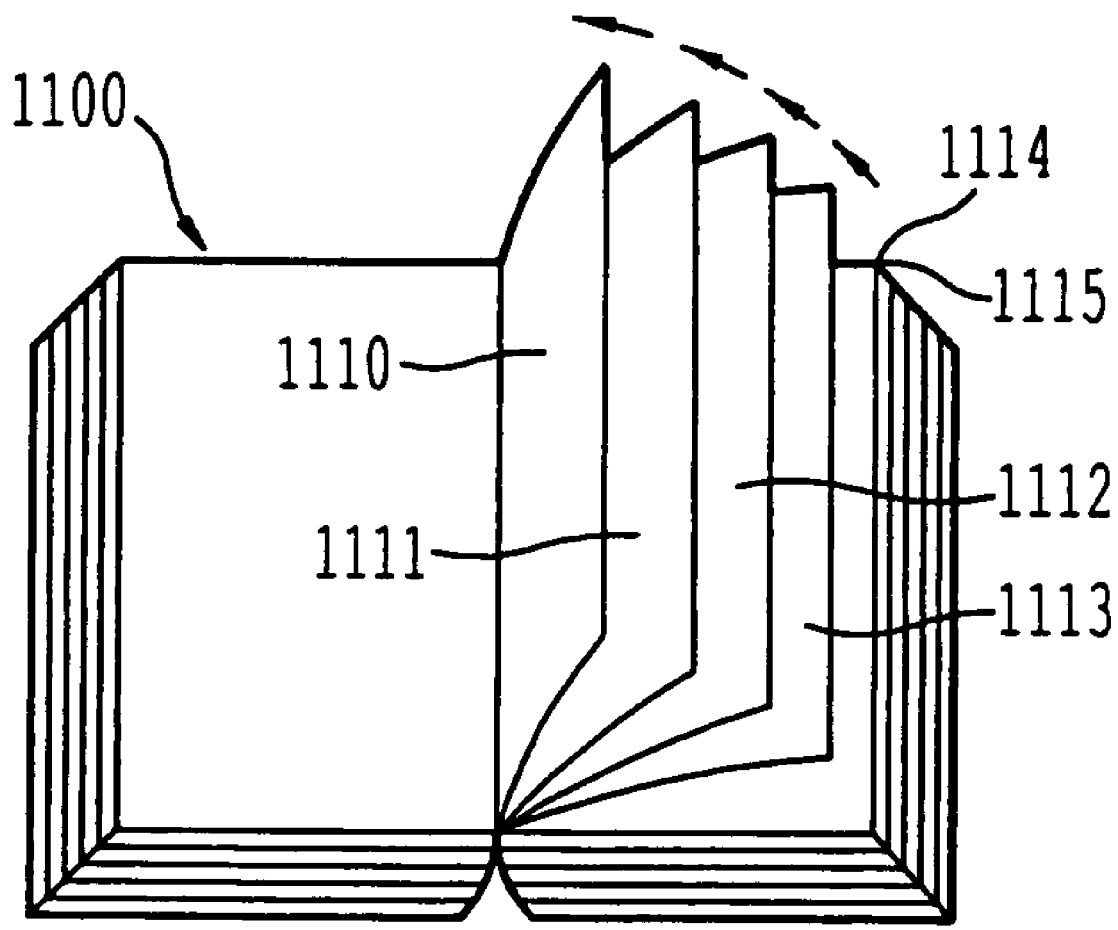
FIG. 4A is a top perspective view of a virtual book at the beginning of some complex flipping processed.
Figure 4B:
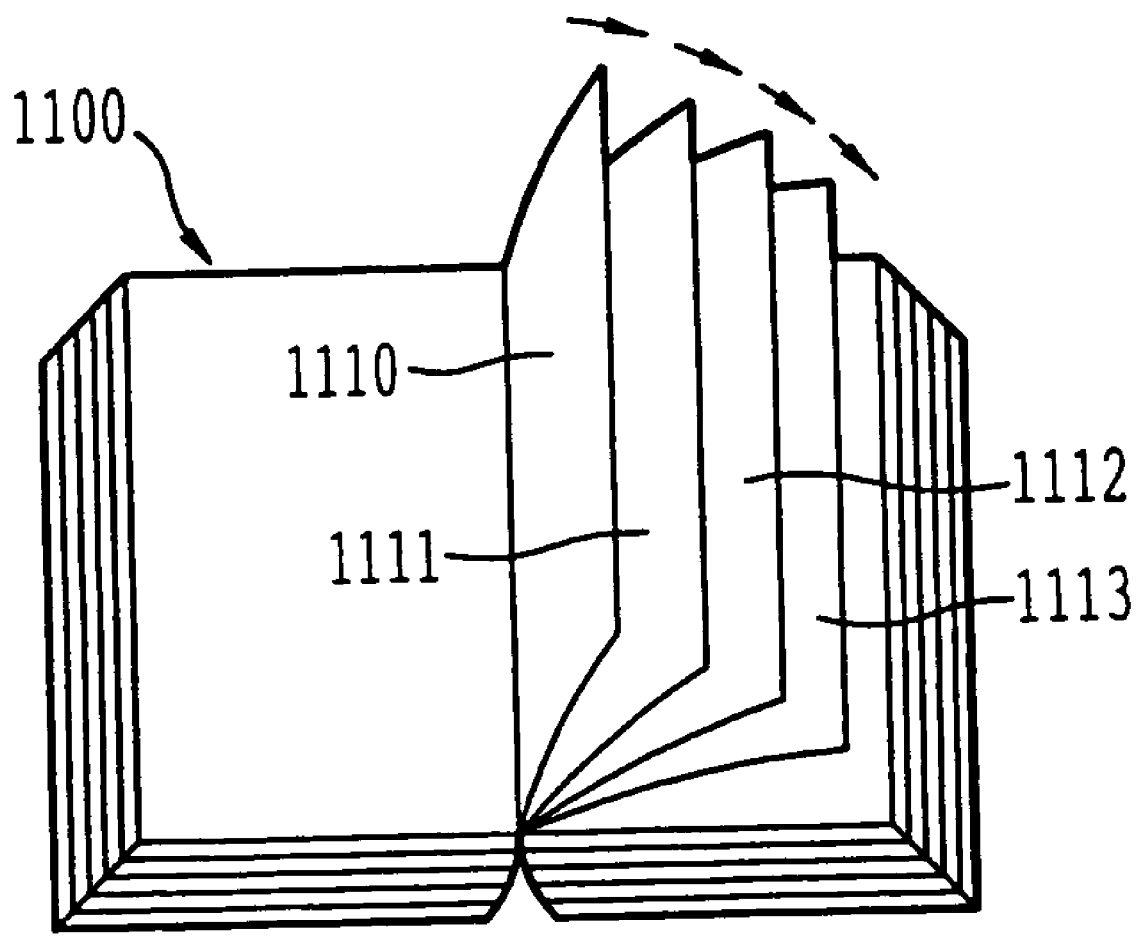
FIG. 4B is a top perspective view of a virtual book showing the change of direction of all the flipping pages.
Figure 4C:
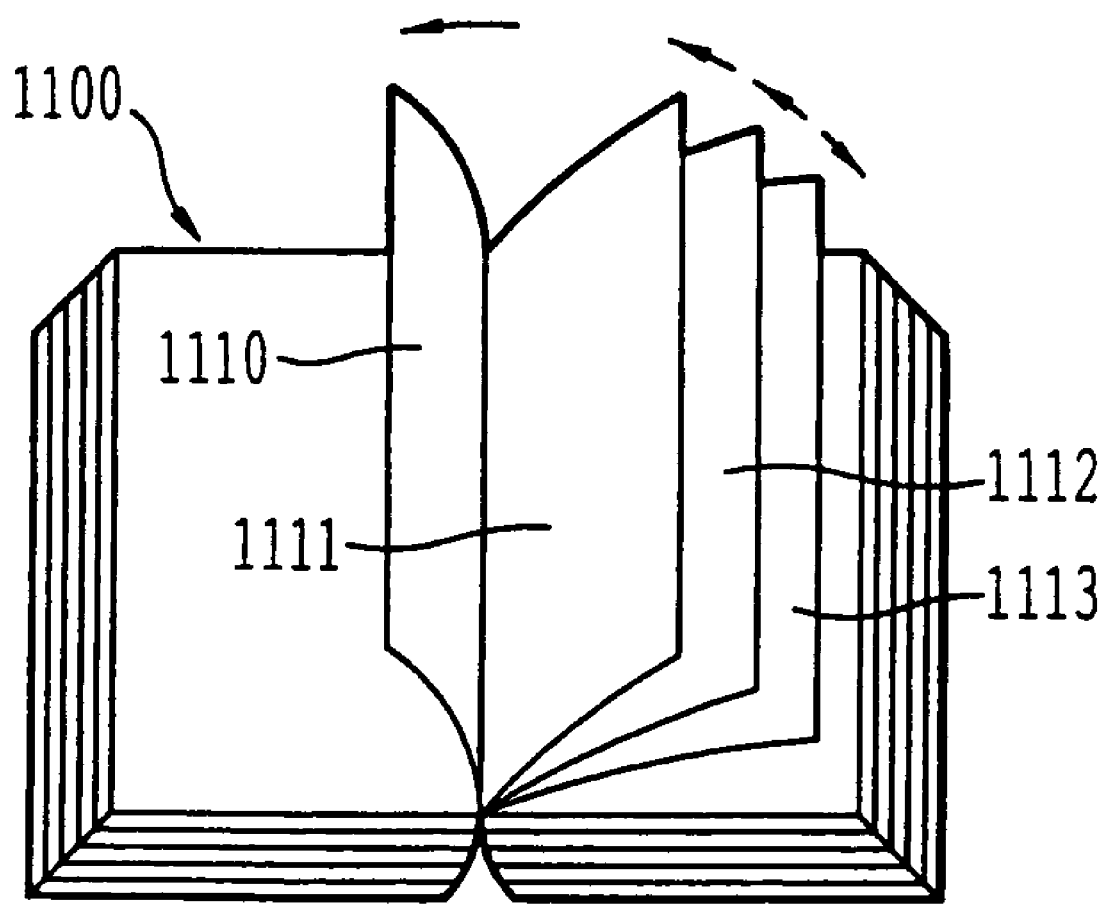
FIG. 4C is a top perspective view of a virtual book showing the change of direction of a trailing page.

FIG. 4A shows a number of pages (1110-1113, etc.) being flipped from the right side of a virtual book 1100 to the left side of the virtual book 1100. (Pages 1114 and 1115 are still resting on the right side of the virtual book 1100). Starting from this flipping state of all the pages (1110-1113, etc.) in FIG. 4A, FIG. 4B shows the flipping direction of all the pages (1110-1113, etc.) being reversed and changed in the midst of flipping. Starting from the flipping state of all the pages (1110-1113, etc.) in FIG. 4A, FIG. 4C shows the direction of the trailing page 1113 being reversed and changed in mid-flip while the other pages (1110-1112) continue to flip to the left side of the virtual book 1100.

Figure 4D:
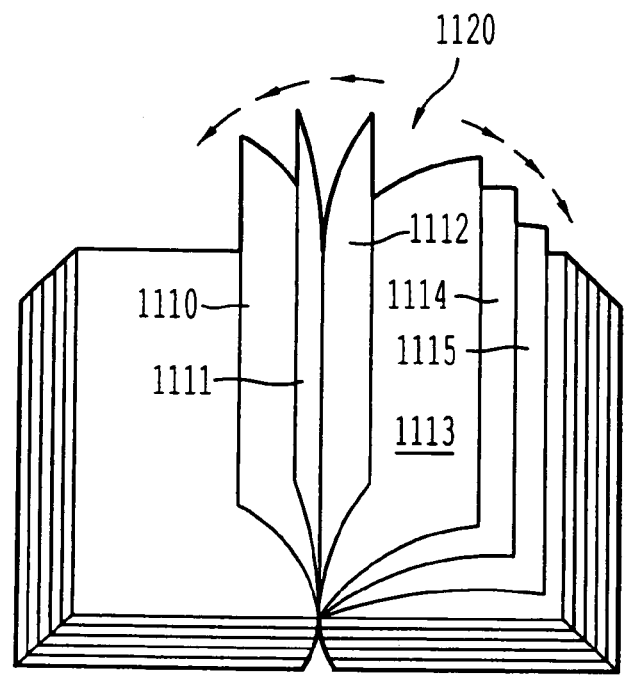
FIG. 4D is a top perspective view of a virtual book showing the change of direction of a group of trailing pages.

Starting from the flipping state of all the four pages (1110-1113) in the virtual book 1100 in FIG. 4A and a few more pages (1114 and 1115) being launched in the same direction (from right to left) subsequently, FIG. 4D shows the direction of flipping of a group of trailing pages (1113, 1114, and 1115) being reversed and changed to going from left to right while the other pages (1110, 1111, and 1112) continue to flip from right to left. The region 1120 between the two sets of pages (1110-1112 on the one hand and 1113-1115 on the other) begin to "open up" and as the two sets of pages continue to flip further in opposite directions, in FIG. 4E it is shown that the region 1121 between them (pages 1110-1112 on the one hand and pages 1113-1115 on the other) opens up further.

Figure 4E:
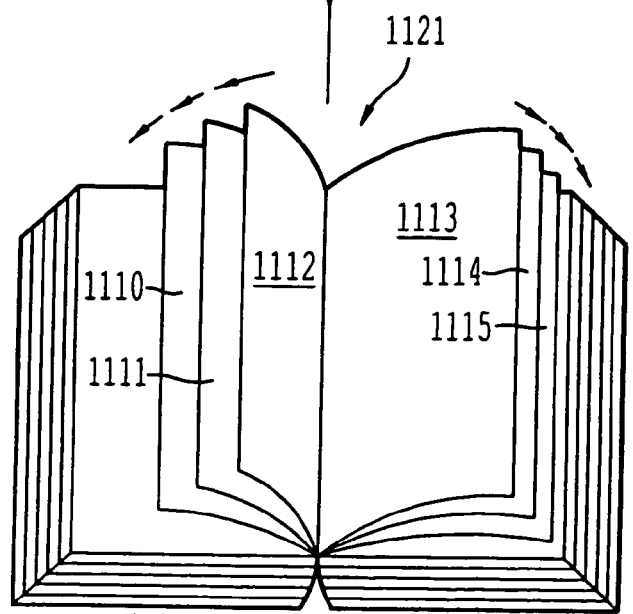
FIG. 4E is a top perspective view of a virtual book showing the opening up of a region in the flipping pages.
Figure 4F:
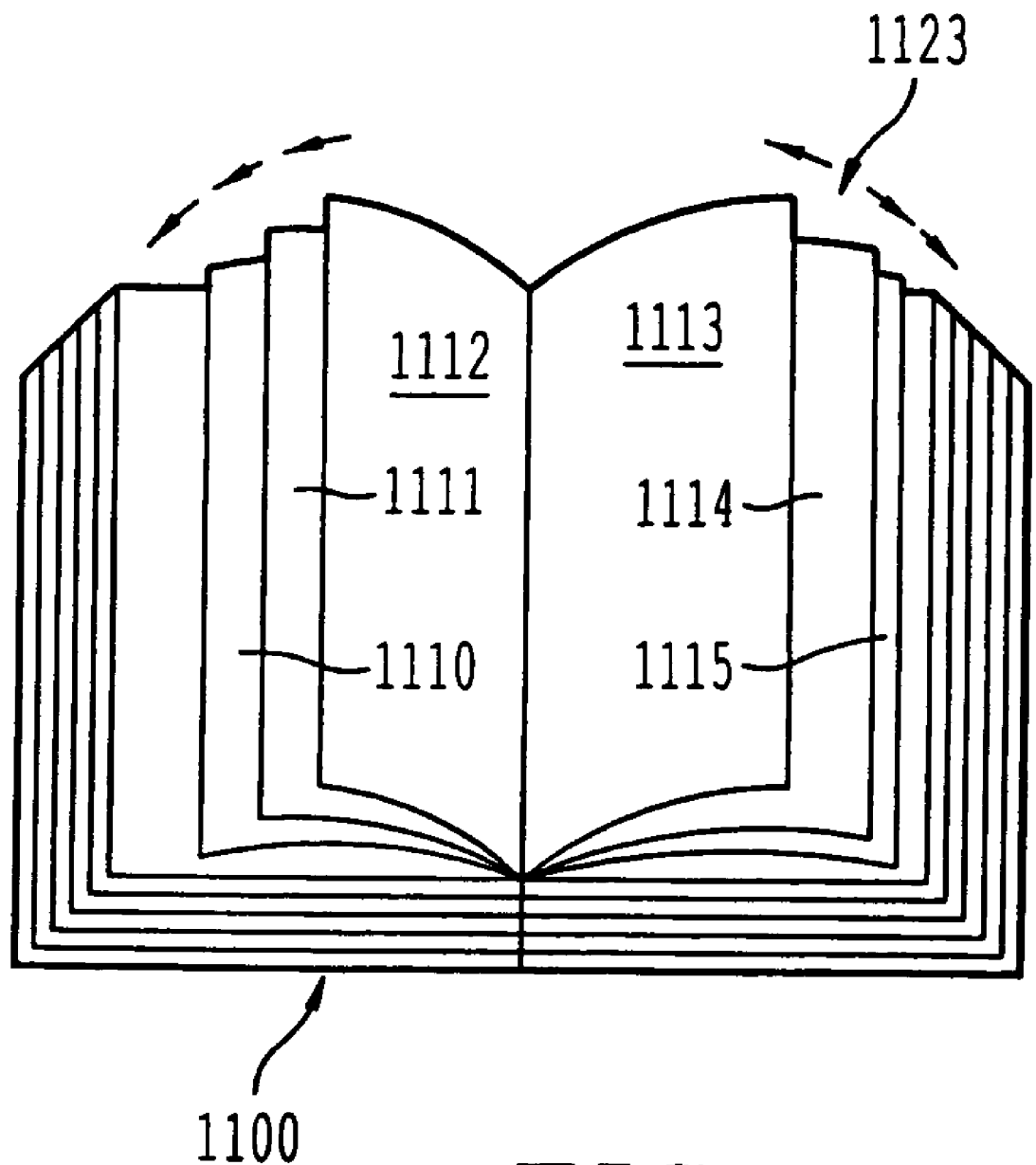
FIG. 4F is a top perspective view of a virtual book showing the change of direction of the trailing page in a right subgroup of flipping pages.

Starting from the flipping state of all the pages (1110-1115) in the virtual book 1100 in FIG. 4E, in which some of the pages (1110-11112) are flipping from right to left and some of the pages (1113-1115) are flipping from left to right, when a certain browsing control command is given, as shown in FIG. 4F, the direction of flipping of the trailing page of the group of pages (1113-1115) on the right side— page 1113—is reversed and changed to flipping from right to left while pages 1114 and 1115 continue to flip from left to right and the region 1123 between the page 1113 and the page 1114 begins to open up.

Figure 4G:
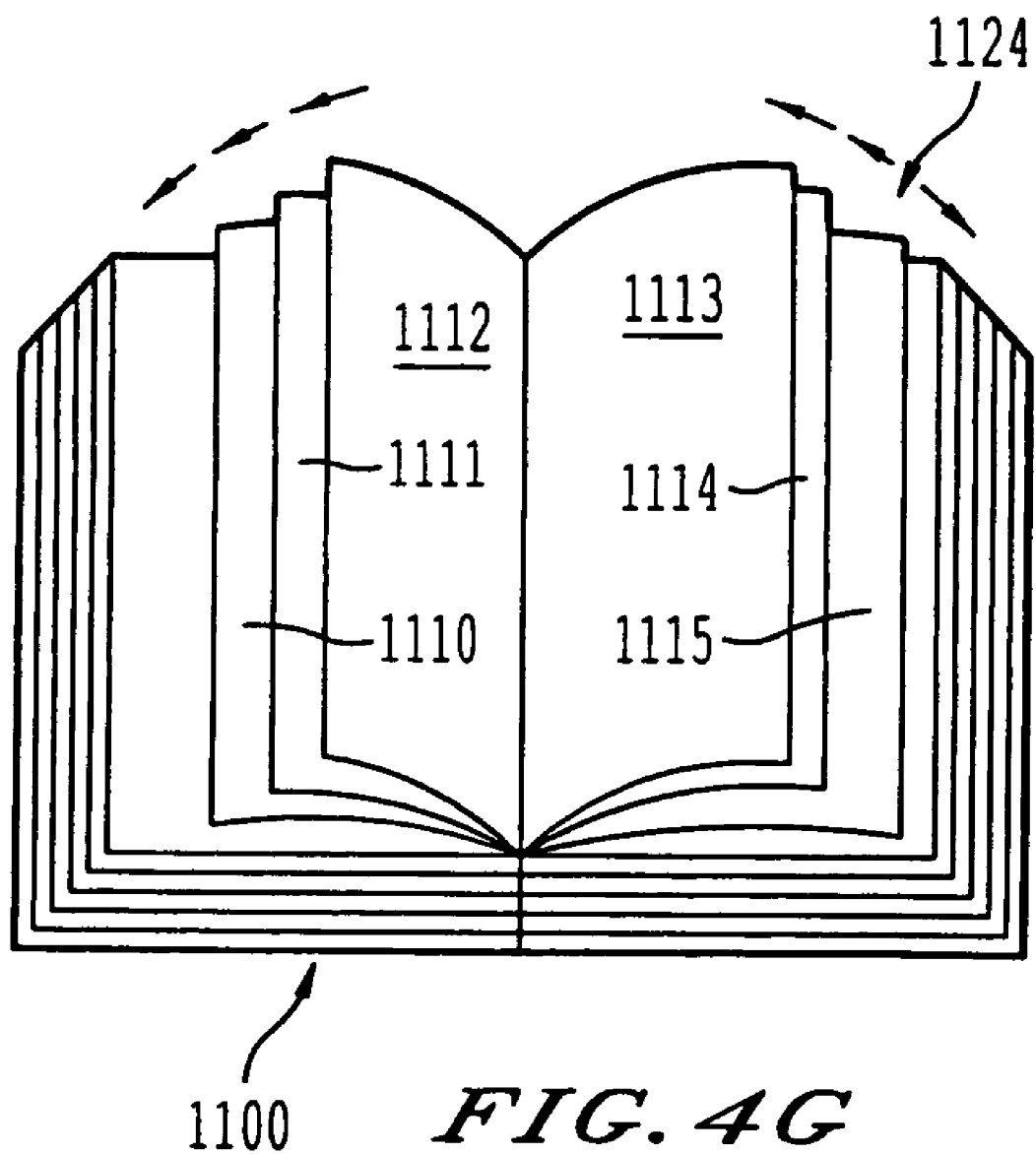
FIG. 4G is a top perspective view of a virtual book showing the change of direction of a number of trailing pages in a right subgroup of flipping pages.

Starting from the flipping state of all the pages (1110-1115) in the virtual book 1100 in FIG. 4E, in which some of the pages (1110-1112) are flipping from right to left and some of the pages (1113-1115) are flipping from left to right, when a certain browsing control command is given, as shown in FIG. 4G, the direction of flipping of a group of trailing pages (1113 and 1114) of the group of pages (1113-1115) on the right side are reversed and changed to flipping from right to left, thus creating a region 1124 that opens up gradually.

Figure 4H:
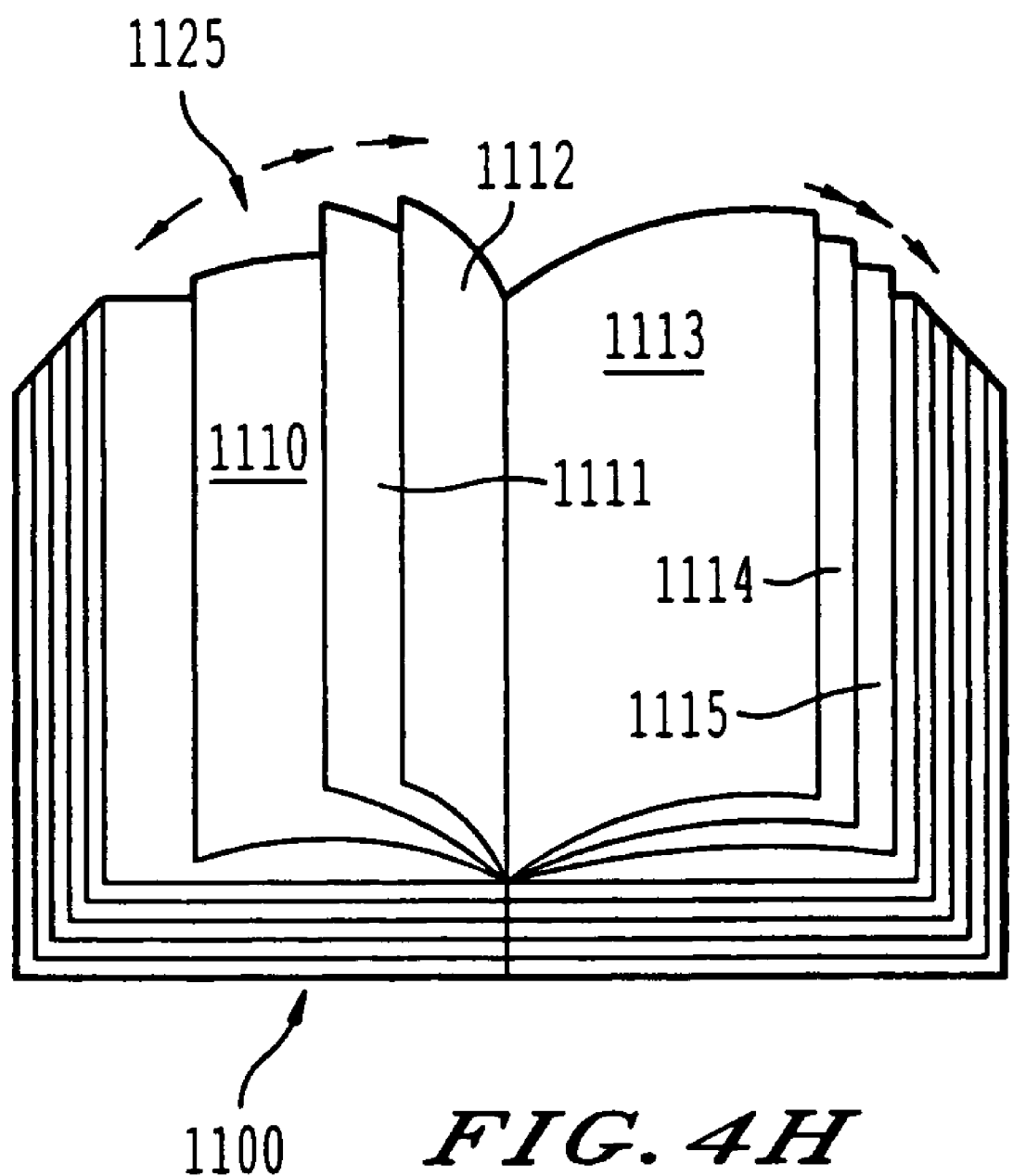
FIG. 4H is a top perspective view of a virtual book showing the change of direction of a number of trailing pages in a left subgroup of flipping pages.

Starting from the flipping state of all the pages (1110-1115) in the virtual book 1100 in FIG. 4E, in which some of the pages (1110-1112) are flipping from right to left and some of the pages (1113-1115) are flipping from left to right, when a certain browsing control command is given, as shown in FIG. 4H, the direction of flipping of a group of trailing pages (1111 and 1112) of the group of pages (1110-1112) on the left side are reversed and changed to flipping from left to right, thus creating a region 1125 that opens up gradually.

Figure 4I:
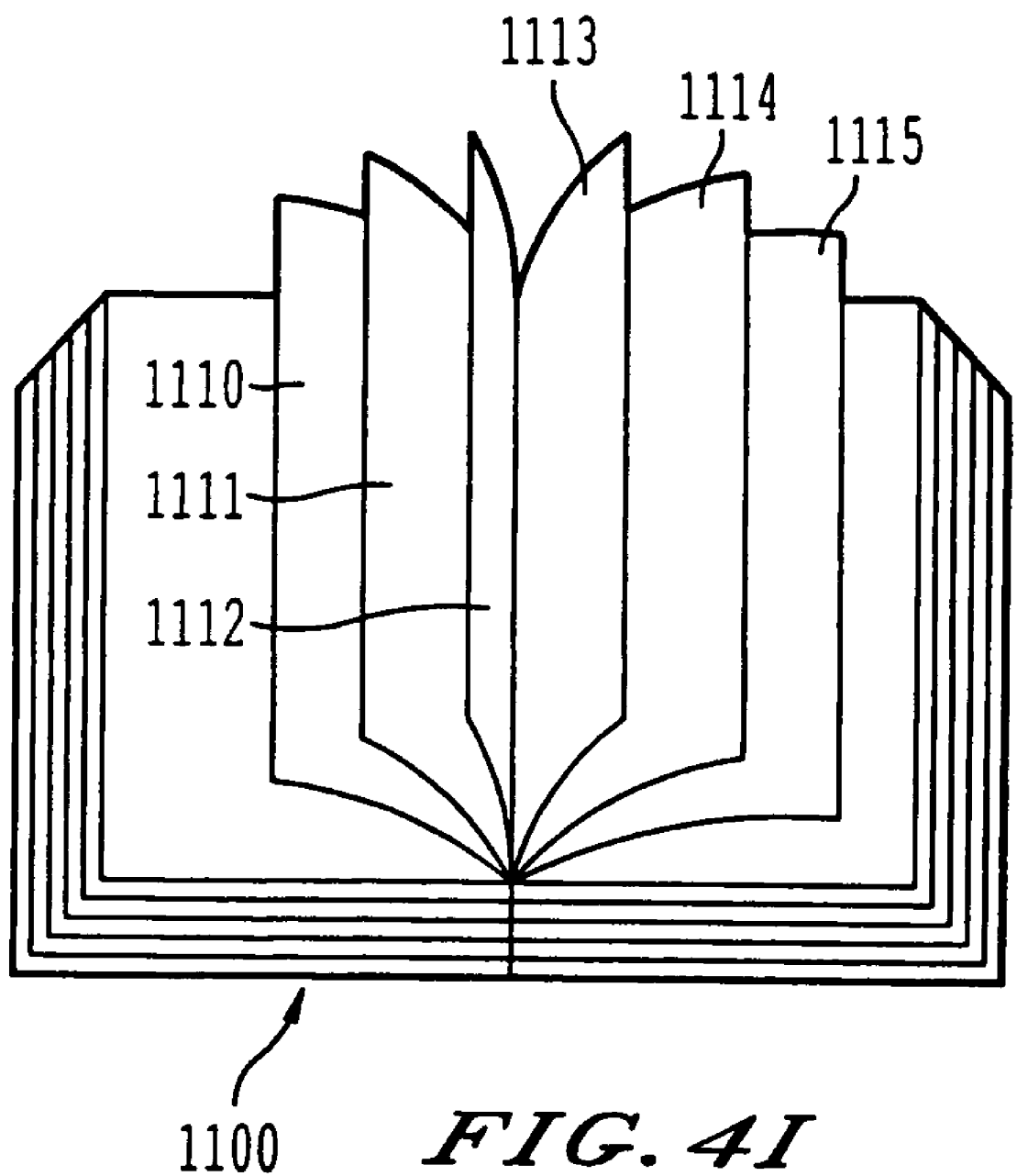
FIG. 4I is a top perspective view of a virtual book showing the freezing of flipping actions of the pages in the midst of flipping across the virtual book.

FIG. 4I shows that starting from the flipping configuration of the virtual book 1100 in FIG. 4A., say, or any of the flipping configuration of the virtual book 1100 in FIGS. 4B-4H, all the pages are made to stop flipping and "freeze" in mid-flip.

After the pages enter this frozen state, they can be "unfrozen". There are 4 situations after "unfreezing": 1. pages are unfrozen and then individual pages continue to flip in the directions prior to freezing; 2. pages are unfrozen and all pages flip in the same direction; 3. pages are unfrozen and some pages flip in the direction right to left to rest on the left side and some flip in the direction left to right to rest on the right side of the book; 4. pages are unfrozen and subgroups of pages flip in different directions.

Figure 5A:
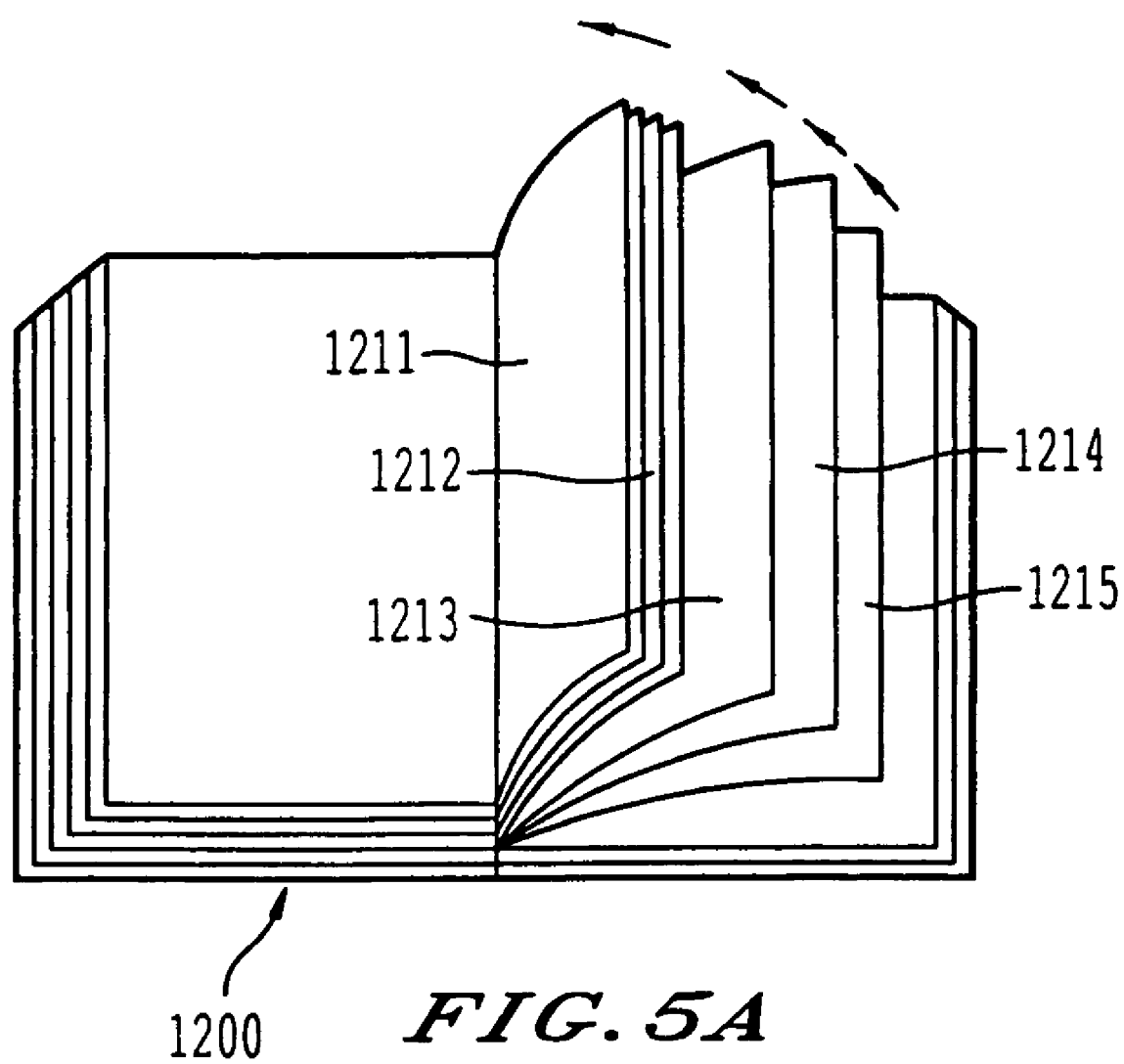
FIG. 5A is a top perspective view of a virtual book showing a collection of flipping pages followed by a series of single flipping pages.

FIG. 5A shows firstly a collection of pages 1212 is being flipped from right to left as a result of, say, a jump operation due to either a bookmark or a jump cursor activation such as that depicted in FIG. 3B, and then that it is followed by a number of trailing single flipping pages 1213-1215 that are launched subsequently.

Figure 5B:
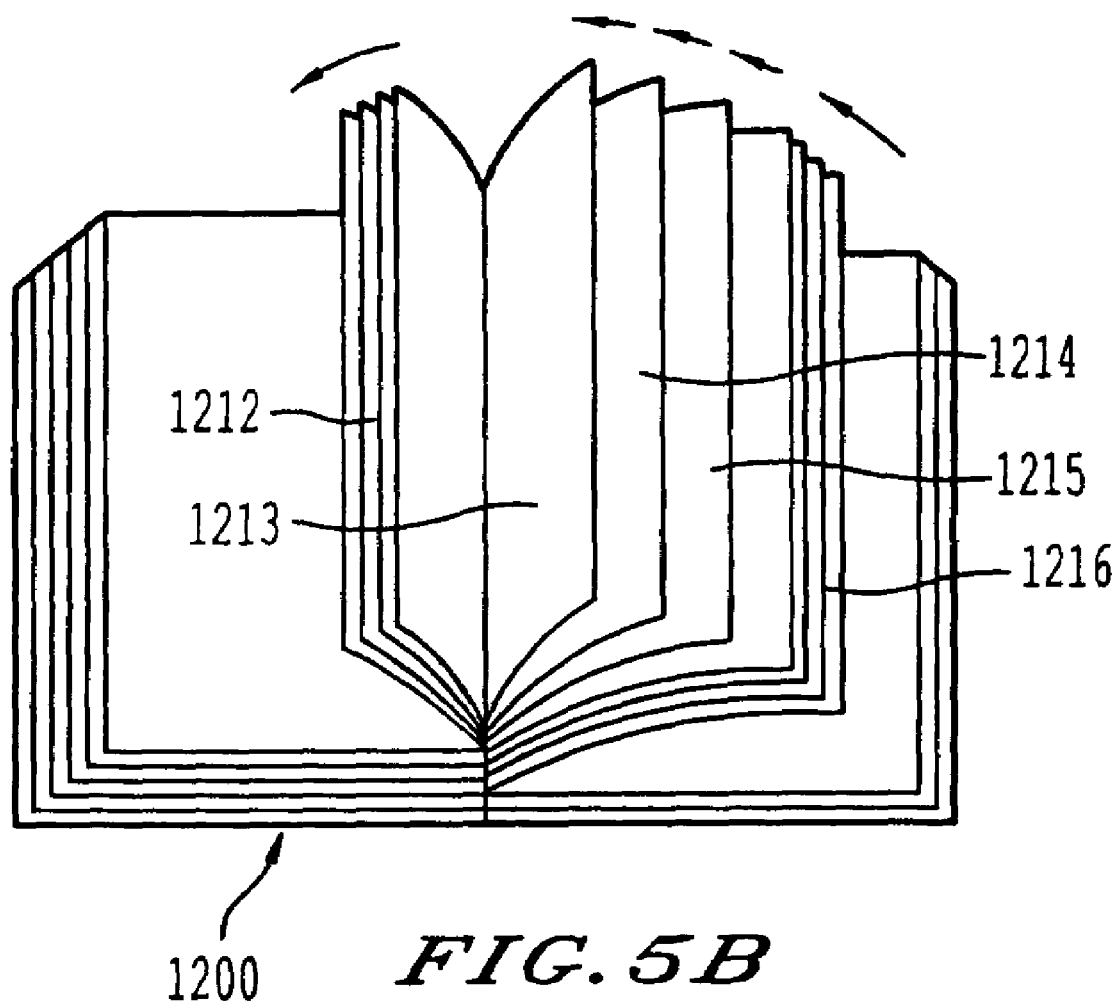
FIG. 5B is a top perspective view of a virtual book showing more than one collection of flipping pages together with a number of single flipping pages.

Starting from the flipping configuration of FIG. 5A, say, in which a collection of pages 1212 being flipped is followed by a number of flipping single pages (1213-1215), a further launching of a collection of pages 1216 is activated as depicted in FIG. 5B as a result of a jump operation due to either a bookmark or a jump cursor activation such as that depicted in FIG. 3B. Subsequent to this, the further launching of any combination of single and/or collection of flipping pages is possible. Subsequent changes of direction of flipping and other movement effects including the freezing in mid-flip of all or some subgroups of this combination of single and/or collection of flipping pages in ways similar to those described for single flipping pages in FIGS. 4B-4I are possible. That is, the collections of pages such as 1212 and 1216 would behave like the single pages in FIGS. 4B-4I.

Figure 6A:
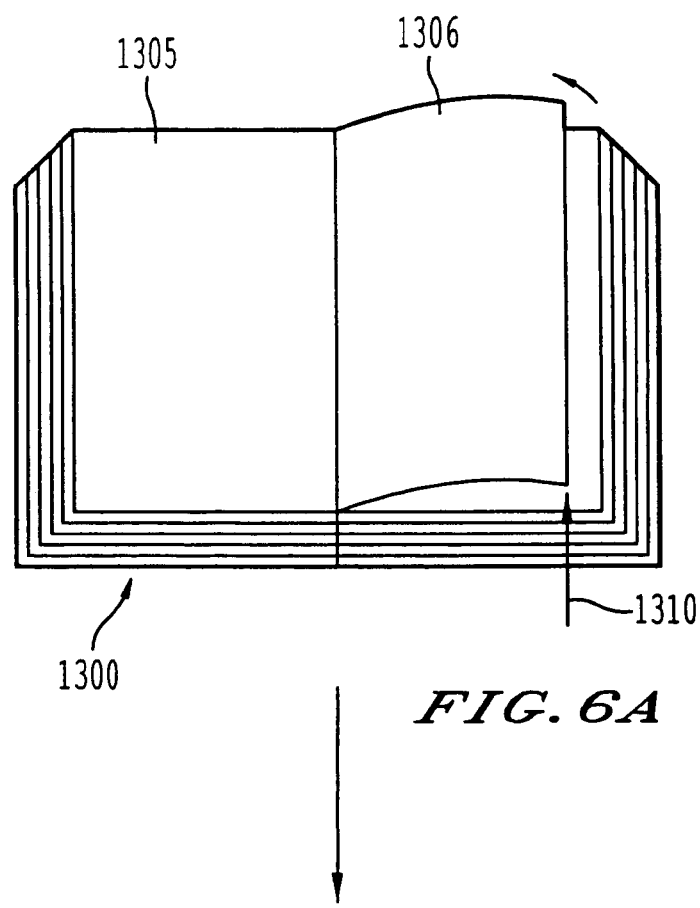
FIG. 6A is a top perspective view of a virtual book showing a right-hand page being picked up.
Figure 6B:
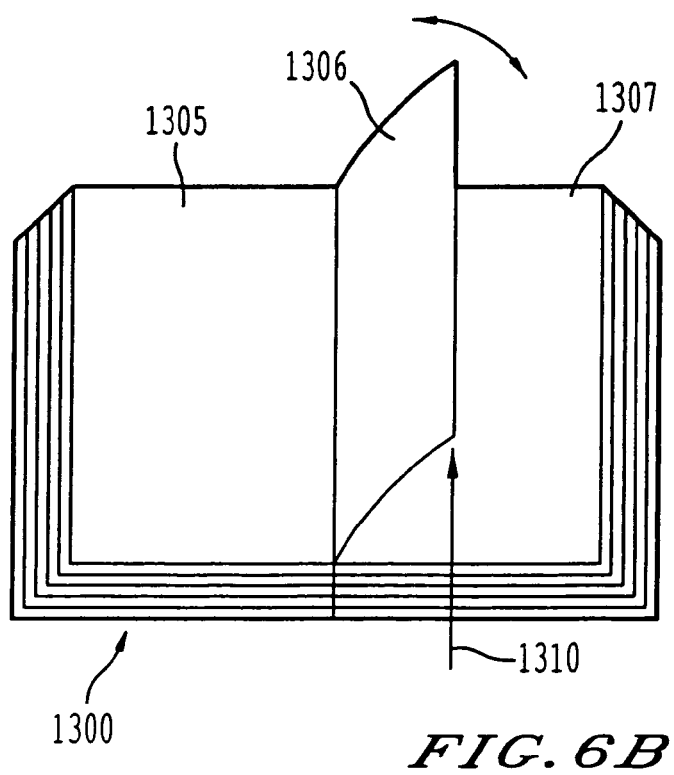
FIG. 6B is a top perspective view of a virtual book showing a picked-up page being held and flipped about.

FIGS. 6A and 6B depict a hold-and-flip method of manipulating a flipping page. Starting from a configuration in which a page is initially at rest, say on the right-hand side of a virtual book 1300, such as page 1306 shown in FIG. 6A, a pointer 1310 picks up the page 1306 from its resting position on the right-hand side of the virtual book 1300, and then the page is flipped by the pointer 1310 as depicted in FIG. 6B either in the direction right to left or left to right. This way, both sides of page 1306 can be inspected repeatedly as many times as it is desired.

Figure 7:
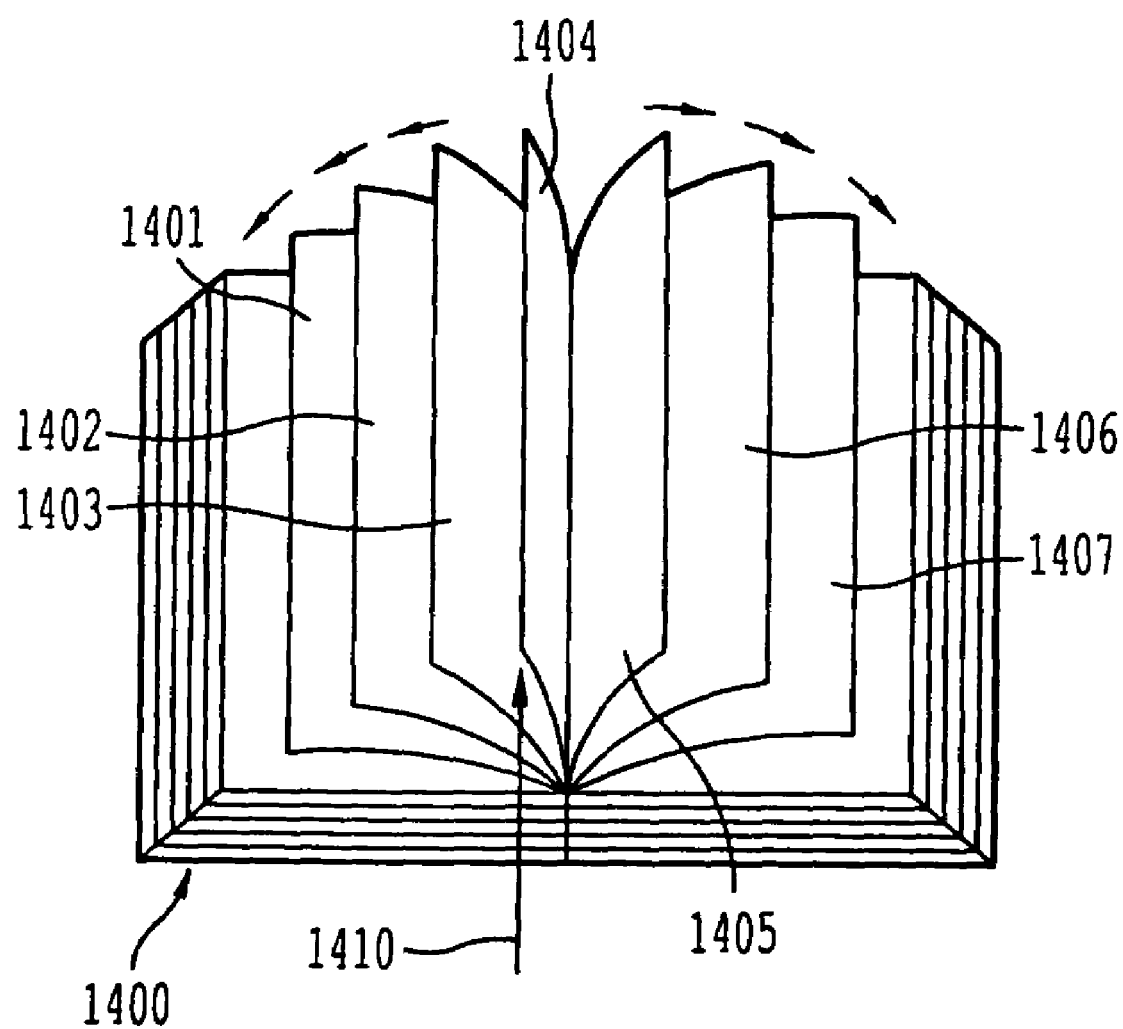
FIG. 7 is a top perspective view of a virtual book showing a picked-up page being held while other pages return to their respective resting positions on the left and right sides of the virtual book.

In another method of entering the "hold-and-flip" mode, FIG. 7 depicts a pointer 1410 picking up a flipping page 1404 in the midst of a flipping action, which might be a flipping page in one of those flipping configurations depicted in FIGS. 4A to 4H or a page in a frozen state such as depicted in FIG. 4I. Thereafter, all the pages 1401-1403 to the left of it and all the pages 1405-1407 to the right of it fall away and end up resting on the left side and the right side of the virtual book 1400 respectively. This picked-up page can then be flipped about and inspected in the hold-and-flip mode.

Figure 8:
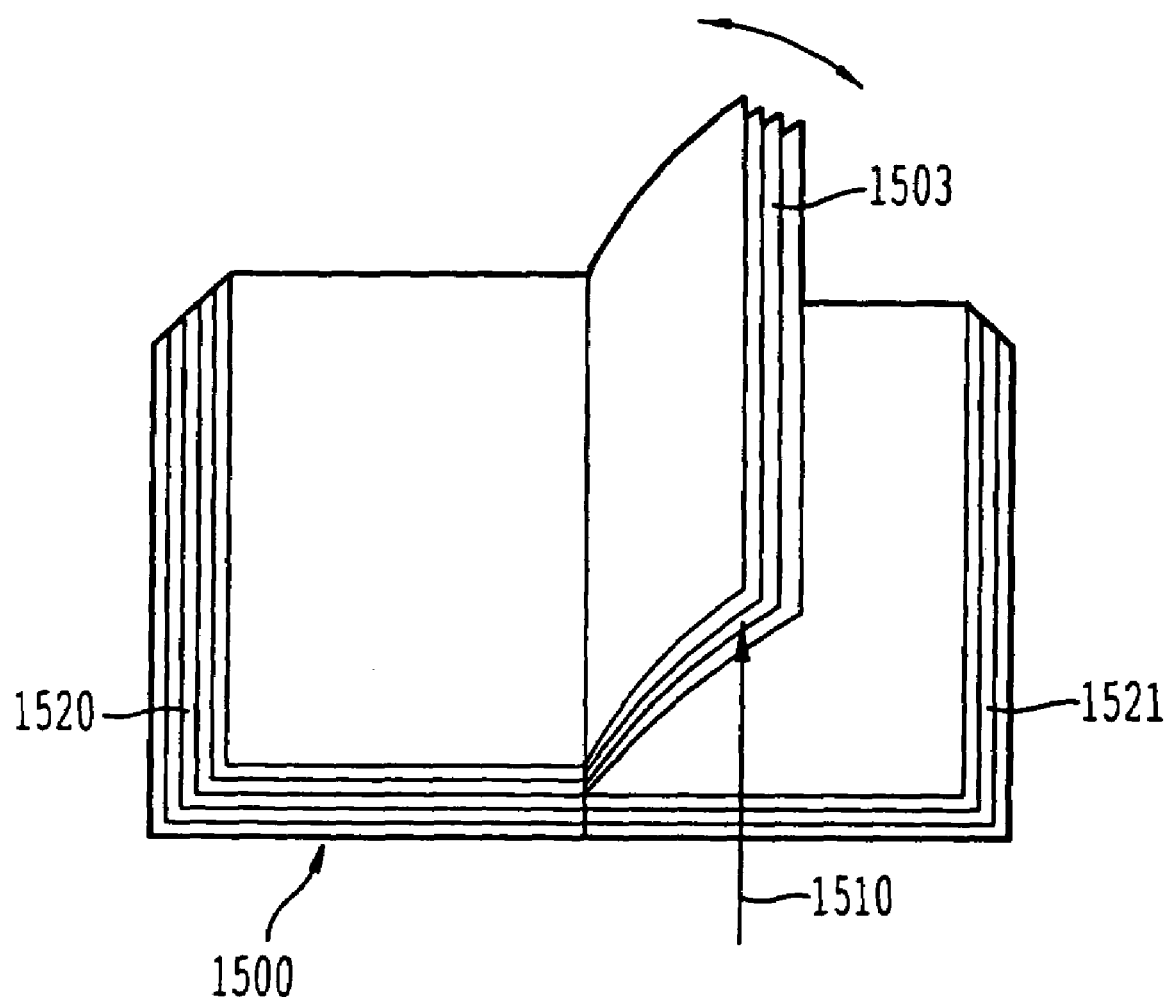
FIG. 8 is a top perspective view of a virtual book showing a collection of pages being held and flipped about.

FIG. 8 depicts the picking up of a collection of pages 1503 in a virtual book 1500 and the subsequent flipping-about action. This is the hold-and-flip method of manipulating a collection of flipping pages instead of just a single page. The collection of pages 1503 can be picked up from its resting state from, say, the right side of the virtual book 1500 or from the midst of a flipping action, say, in a configuration such as that depicted in FIG. 5B in which a number of collections of flipping pages are shown to be in flipping action.

Figure 9:
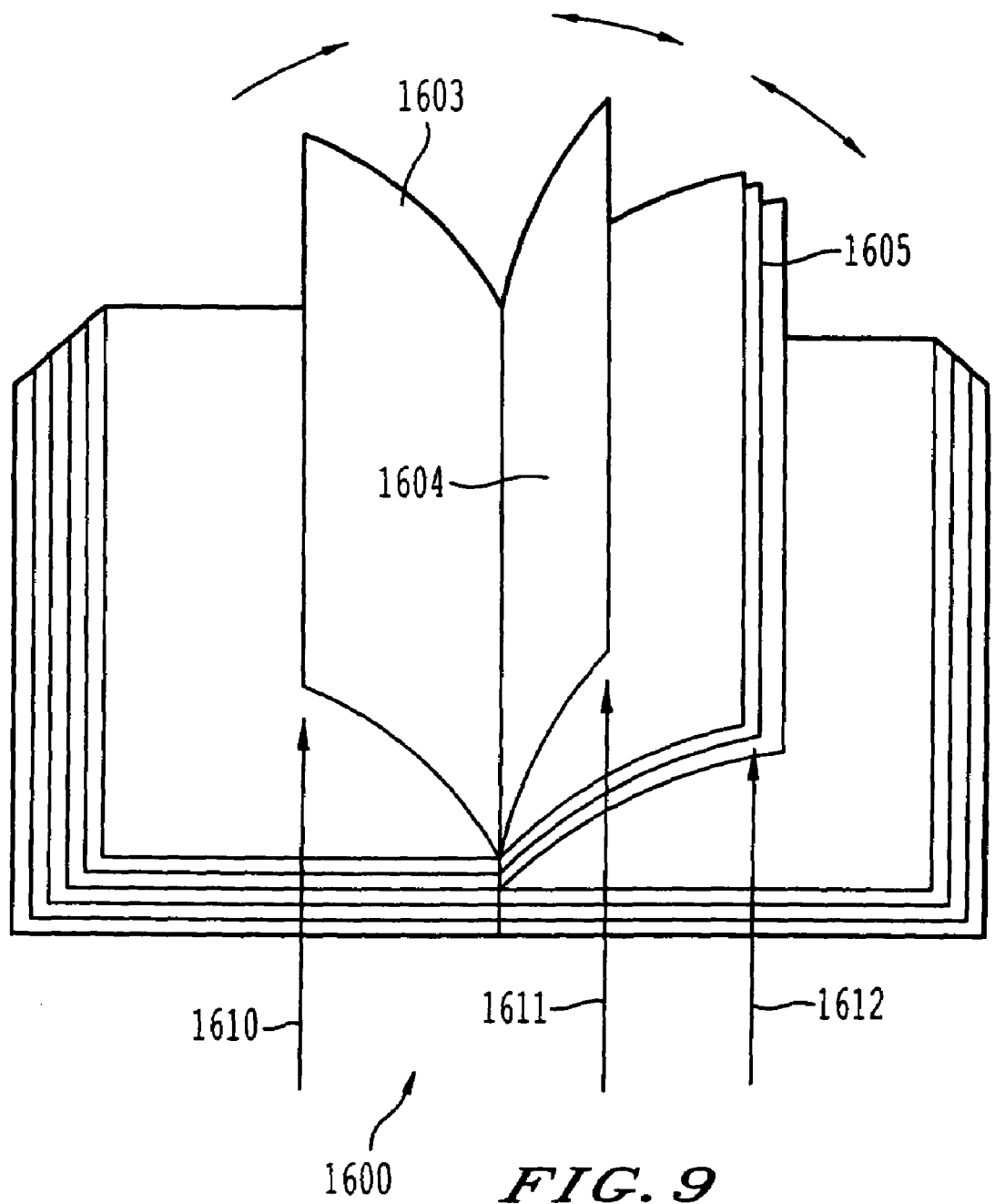
FIG. 9 is a top perspective view of a virtual book showing a number of single pages and collections of pages being held and flipped about.

FIG. 9 depicts the simultaneous hold-and-flip action applying to more than one single page (e.g., 1603 and 1604) and/or collection of pages (e.g., 1605). A number of pointers (1610-1612) are involved in the holding and flipping action.

Figure 10A:
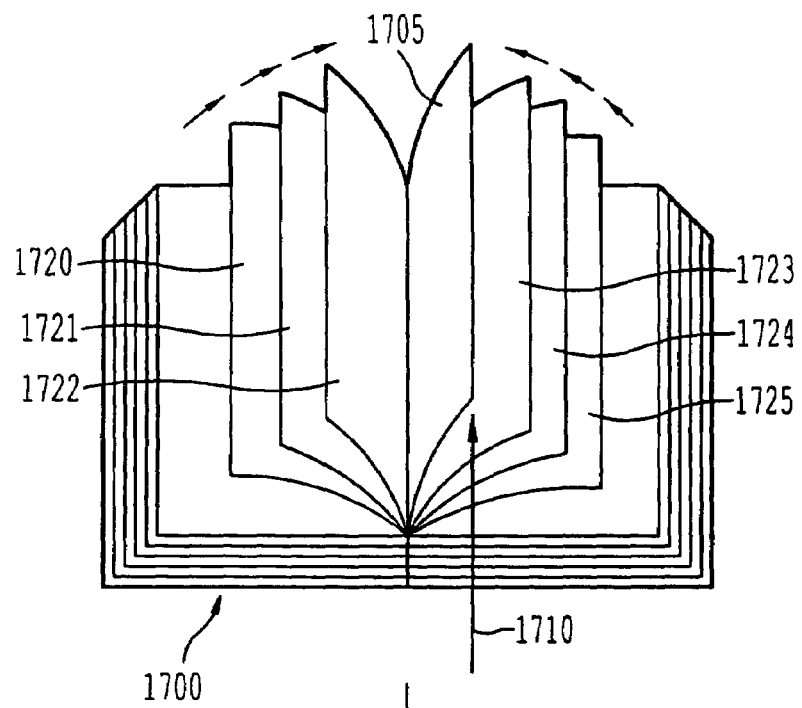
FIG. 10A is a top perspective view of a virtual book showing a single page being held while a number of other flipping pages are collected onto it.
Figure 10B:
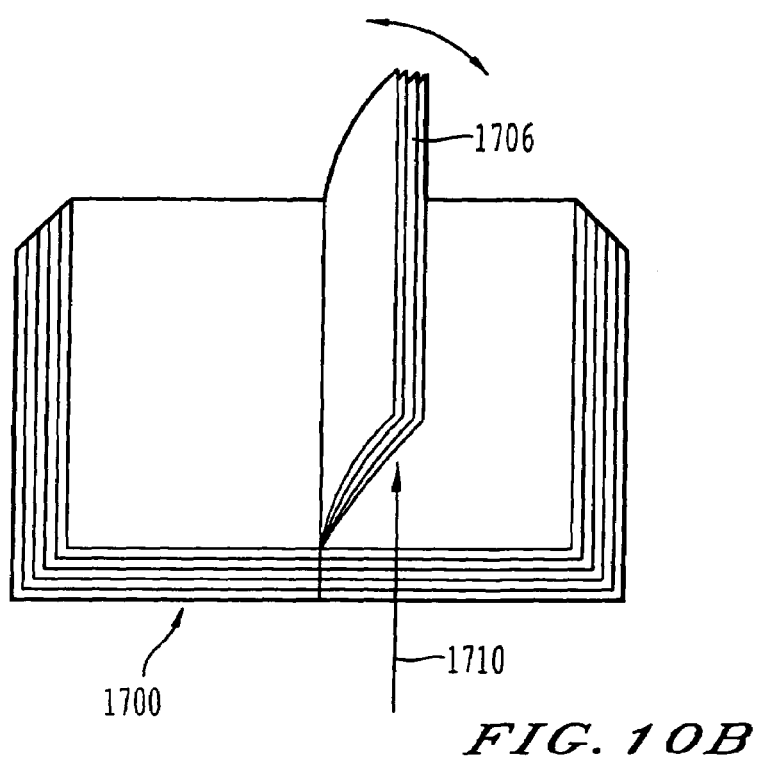
FIG. 10B is a top perspective view of a virtual book showing the effect of holding a collection of a number of pages and flipping it about.

FIGS. 10A and 10B depict a hold-and-collect method of manipulating pages in a virtual book 1700. A page 1705 in the virtual book 1700 is first picked up by a pointer 1710 (either when the page 1705 is at rest on the right or left side of the virtual book 1700 or when it is in the midst of some flipping action). And then, pages 1720-1725 to its left and/or right sides, whether they are initially in the midst of some flipping action or at rest on the left and/or right side of the virtual book 1700, are all "collected" onto the page 1705, resulting in a collection of pages 1706 as shown in FIG. 10B. This entire collection 1706 can then be flipped about as depicted in FIG. 10B.

Figure 10C:
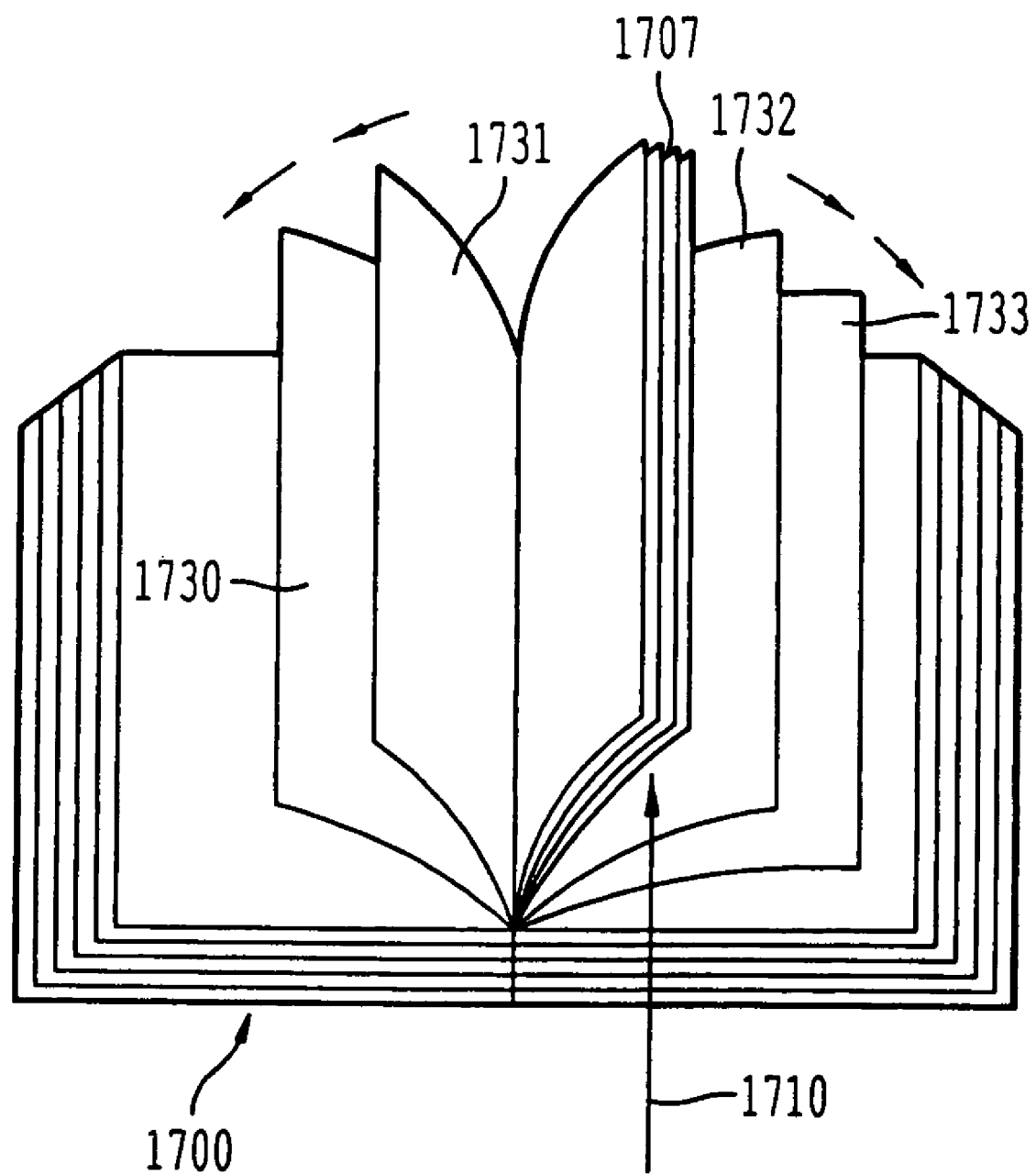
FIG. 10C is a top perspective view of a virtual book showing the effect of releasing a number of pages from a collection of pages.

FIG. 10C depicts a number of pages 1730-1733 being released from a collection of pages 1707 being held in mid-flip by a pointer 1710.

Figure 11A:
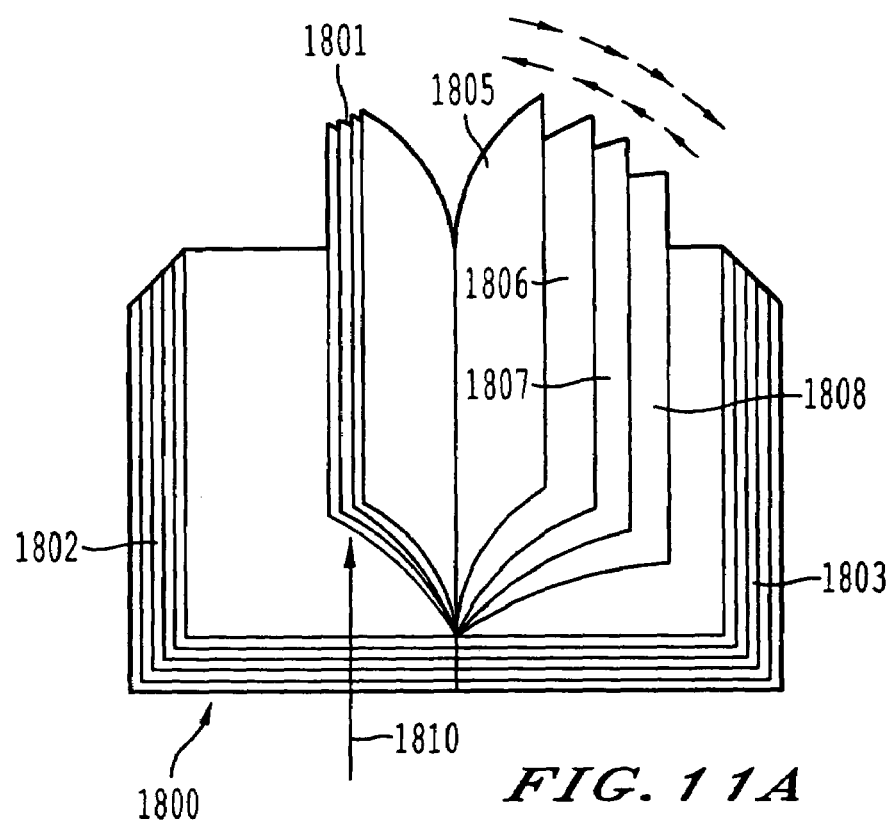
FIG. 11A is a top perspective view of a virtual book showing a collection of pages being held and forming a sub-book together with the right side thickness of the virtual book while flipping and browsing actions are carried out on a number of pages between them.

FIG. 11A depicts a hold-and-browse method of manipulating pages in a virtual book 1800. A single page and/or a collection of pages 1801 is first picked up by a pointer 1810. And then, this collection of pages 1801 and the right side thickness 1803 become a new "sub book" between which all kinds of browsing and flipping actions can take place for a number of pages (such as pages 1805-1808).

Figure 11B:
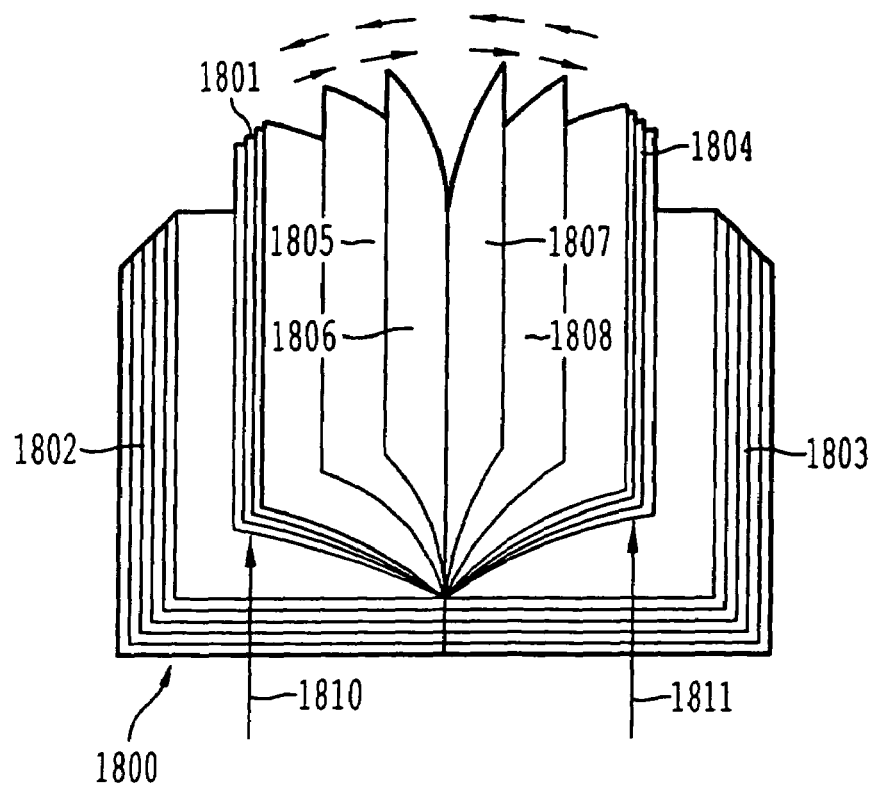
FIG. 11B is a top perspective view of a virtual book showing two collections of pages being held forming a sub-book between them while flipping and browsing actions are carried out on a number of pages between them.

FIG. 11B depicts another hold-and-browse method of manipulating pages in a virtual book 1800 involving two collections (1801 and 1804) of pages. The two collections of pages 1801 and 1804 are being picked up by two pointers 1810 and 1811 respectively. These two collections of pages 1810 and 1811 then become a "sub book" between which all kinds of browsing and flipping actions can take place for a number of pages (such as pages 1805-1808). In general, any two pages and/or collection of pages can be made into a "sub book" between which the usual browsing and flipping action of a number of pages can take place.

FIG. 12 summarizes all the basic and complex flipping actions described above.

All of the complex flipping actions depicted in FIGS. 3-11 can be controlled by a mouse, one of the browsing controllers described in U.S. Pat. No. 5,909,207 (Ho), and one of these browsing controllers in conjunction with a mouse and/or other pointing and control methods. Specifically, the flipping actions can be controlled by a controller as depicted in FIG. 13.

Figure 13:
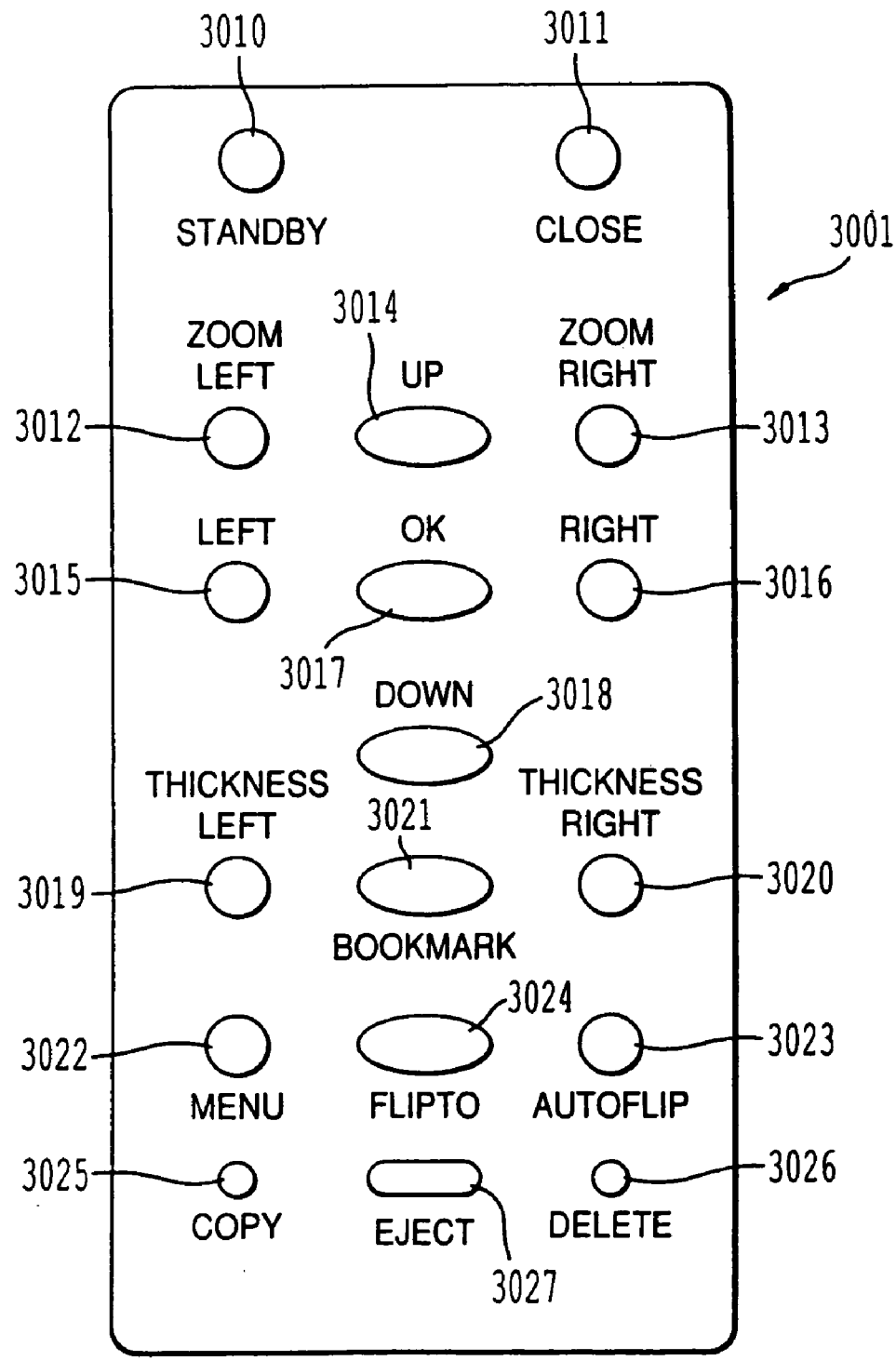
FIG. 13 is a top perspective view of a controller that controls the virtual book and other displayed items on a display screen.

The controller 3001 depicted in FIG. 13 combines several functions into a single controller. The remote controller 3001
1. controls the virtual book's 204 flipping action;
2. selects to display one or more menus to be displayed on the display screen 201;
3. selects the items on the displayed menu displayed on the display screen 201, and
4. effects certain actions such as the ejection of a DVD drive or the deletion of certain selected memory on the memory and control device 202.

The STANDBY button 3010 on the controller (computer) turns on or turns off the display screen 201 and/or some other circuitries in the memory and control device 202. The CLOSE button 3011 closes a menu or a virtual book 204 on the display screen 201, returns from a full-screen zoom (to be described below), or returns from thickness or bookmark selection mode (to be described below).

The ZOOM-LEFT and ZOOM-RIGHT buttons (3012 and 3013) enlarge the left hand or right hand page respectively to full screen mode. The UP and DOWN buttons (3014 and 3018) are for the upward and downward selection movement on a menu or on the bookmarks (105-107) displayed on the sides of the virtual book 204. (That is, in the absence of a mouse, the method to select, say, the various bookmarks would be first to select to enter the bookmark mode (e.g., by pressing button 3024 to be described below), and then use the UP and DOWN buttons (3014 and 3018) to highlight the various vertically placed bookmarks, and when a certain one is desired, the pressing of an "OK" button (3017, to be described below) would select it.)

The LEFT and RIGHT buttons (3015 and 3016) are for the leftward and rightward selection movement on a menu, on the bookmarks, on the thicknesses (101 and 102), or on the left and right pages. If no menu, bookmarks, thickness or other mode is entered, the LEFT and RIGHT buttons (3015 and 3016) are for the flipping of the pages to the left or right respectively. The OK button 3017 is for the confirmation of any selected option. The LEFT THICKNESS and RIGHT THICKNESS buttons (3019 and 3020) are for the selection of the left and right thicknesses (101 and 102) respectively on the virtual book (100 or 204). The BOOKMARK button 3021 is for selecting to enter the bookmark mode. In the bookmark mode, one can either select to add a bookmark to or remove a bookmark from a page or select to jump to a bookmarked page. The process is as follows. First the BOOKMARK button 3021 is pressed. The system then enters the bookmark mode. Then, suppose there are already a number of bookmarks (e.g., bookmarks 105-107 in FIG. 1A) present on the virtual book (100 or 204), the user can use the LEFT button 3015 to highlight indicate that he would like to select one of the bookmarks on the left thickness 101, and then use the UP and DOWN buttons (3014 and 3018) to select the particular bookmark that he desires. When the desired bookmark is selected, the pressing of the OK button 3017 will cause the virtual book 204 to flip to the bookmarked page, complete with thickness animation such as that shown in FIG. 1B.

The use of the LEFT and RIGHT THICKNESS buttons (3019 and 3020) are as follows. First, the user uses the buttons (3019 and 3020) to select the left or right thickness (101 and 102 respectively) on the virtual book (100 or 204). A jump cursor (110 or 111) will appear on the thickness indicating the position selected on the thickness. (The position selected on the thickness corresponds to a point in the virtual book 204.) To change the selected position on the thickness, the user uses the LEFT and RIGHT buttons to move the jump cursor (110 or 111 on virtual book 100) left or right until the desired position is reached. Then, with the pressing of the OK button 3017, the virtual book 204 will flip to the desired page, complete with thickness animation such as that shown in FIG. 1B.

The MENU button 3022, when pressed, displays a menu on the display screen 201 for the purpose of triggering a variety of actions. The AUTOFLIP button 3023, when pressed, causes the virtual book 204 to enter the auto-flipping mode in which the pages are automatically flipped without the need for the pressing of any flipping button. The FLIPTO button 3024 allows the user to select to flip to a number of desired pages. On pressing of the button 3024, a menu will appear on the display screen 201 and the user can select to flip to the front cover, back cover, or any desired page based on, say, the page number.

The COPY button 3025, when pressed, causes the contents of the memory on the memory and control device 202 to be copied onto another medium (such as a writable CD) inserted into the memory and control device 202. The EJECT button 3027, when pressed, causes the DVD, CD or other kinds of memory drive to be ejected from the memory and control device 202. The DELETE button 3026, when pressed, causes the memory in the memory and control device 202 to be deleted.

Figure 14:
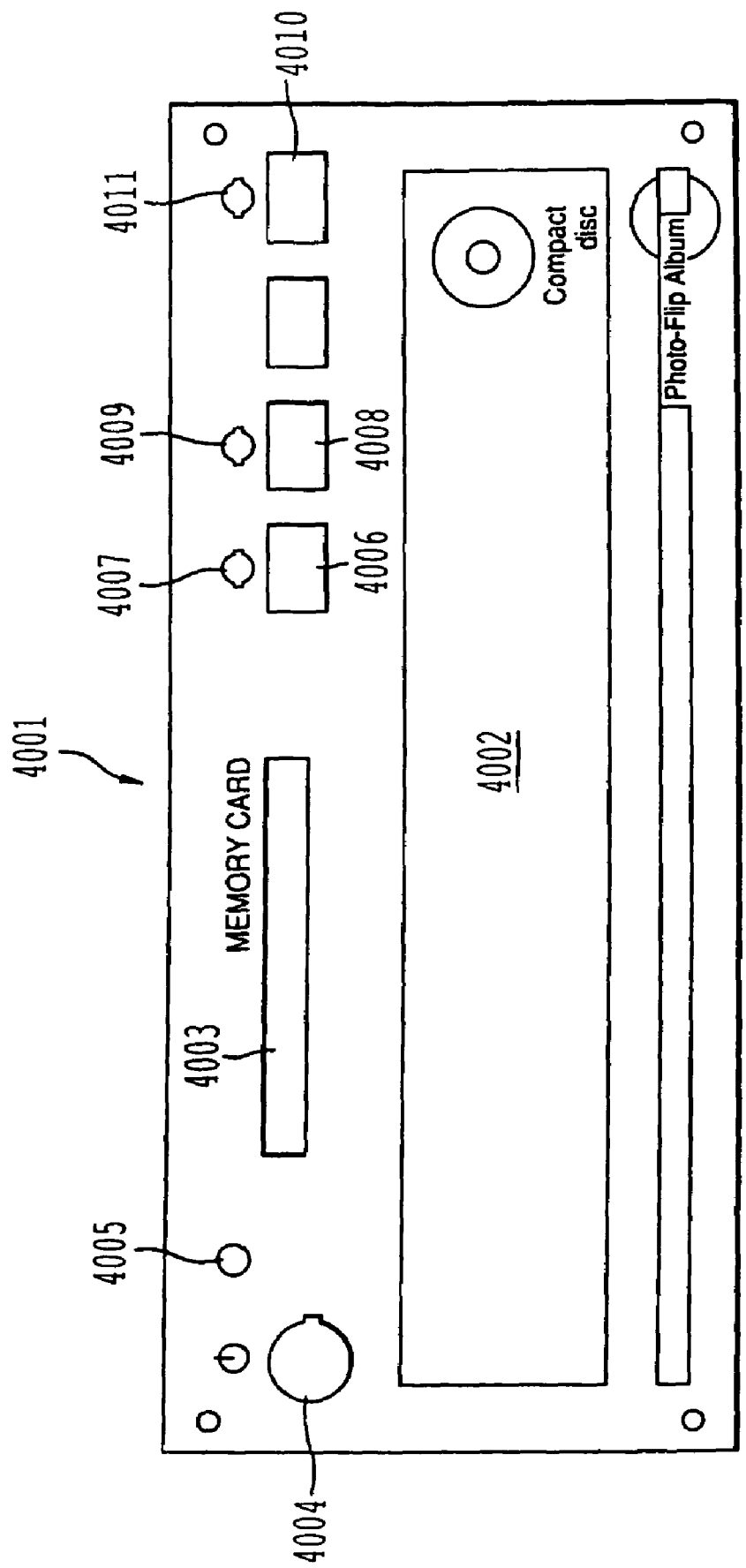
FIG. 14 is a front perspective view of a memory and control device that sends signals to display and control images displayed on a display screen.

FIG. 14 shows the front face of an embodiment 4001 of the memory and control device 202. The memory and control device 4001 consists of a memory drive 4002 and a memory card slot 4003. The button 4004 is the power on/off button and the indicator light 4005 indicates whether the memory and control device 4001 has been turned on or off. The memory card slot 4003 allows a memory card, such as that removed from a digital camera after a certain number of pictures have been stored inside, to be inserted and read. The CD drive 4002 allows either a blank writable CD/DVD, a pre-recorded CD/DVD or other similar memory medium to be inserted to be written to or read from. The pressing of the COPY button 4006, say, can transfer all the data from the memory card in the memory card slot 4003 to the medium in the memory drive 4002. The indicator light 4007, when lit, indicates that the transfer is in progress. The DELETE button 4008, when pressed, causes the memory card in the memory slot 4003 to be deleted. The indicator light 4009, when lit, indicates that the deletion is in progress. The eject button 4010, when pressed, causes the memory drive 4002 to be ejected. The indicator light 4011, when lit, indicates that the ejection is in progress.

The memory drive 4002 and memory card slot 4003 described above are only particular embodiments. In general, these can be any kind of drive for reading and writing to any kind of memory medium and there can be more than two of these.

Figure 15:
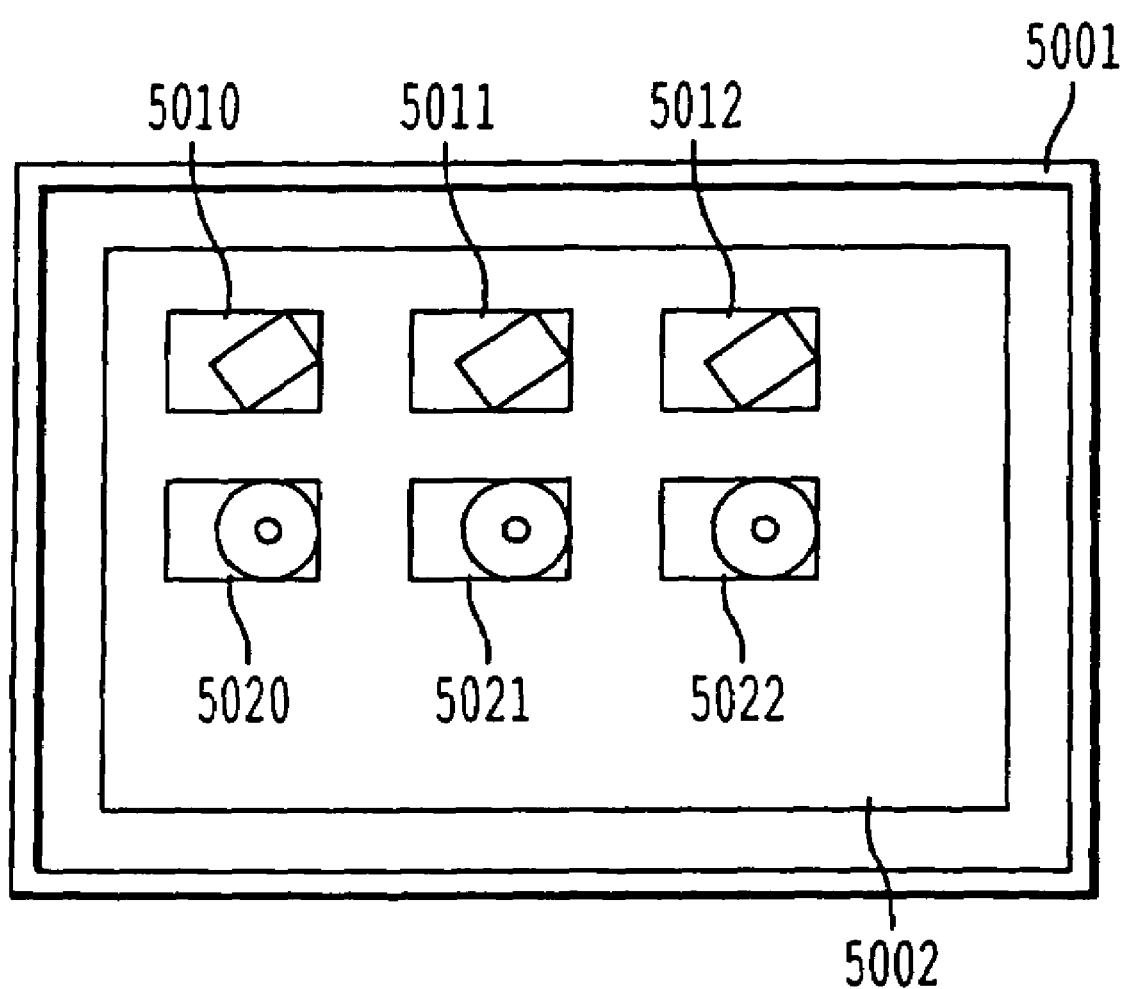
FIG. 15 is a interface displayed on a display screen for the selection and manipulation of images displayed on the display screen.

When the memory and control device 202 begins operation and before any memory medium is inserted, the display screen (5001, FIG. 15) is blank (other than showing, say, a frame 5002 as shown in FIG. 15, to indicate that the memory and control device 202 is turned on). When a memory card is inserted into the memory card slot 4003, if there is data on the card, say, placed into three separate folders/files, the screen 5001 will show three separate folders/files 5010, 5011, and 5012 with graphic/textual indication that they are from the medium in the memory card slot 4003. When a medium is inserted into the memory drive 4002, icons representing the folders/files in the medium (5020, 5021, 5022) are also shown on the display screen 5001.

With the folders/files on the screen, the user can use the UP/DOWN and LEFT/RIGHT buttons (3014, 3018, 3015 and 3016) to select the folder/file desired. When the desired folder/file is selected, pressing the OK button 3017 will cause a virtual book 204 to be displayed on the display screen 201 containing the contents of the selected folder/file.

The information displayed on the display screen 204 and controlled by the controller 203 can come from the memory medium within the memory and control device 202 or from the Internet, through either a wire or wireless connection, or from other devices.

More buttons can be added to the controller 203 to effect the other complex flipping actions such as those listed in FIG. 12 and depicted in FIGS. 3-11. These buttons can also be used to effect fine control of searching for the page to jump to by using a fine-control thickness region 150 as shown in FIG. 1E and described above.

The memory and control device 202 (FIG. 2) or 4001 (FIG. 14), other than deriving its data from a memory card inserted in its memory card slot 4003 (FIG. 14), can also derive the data to be shown on the screen 201 (FIG. 2) as a virtual book 204 from a CD or other memory media inserted into its memory drive 4002 (FIG. 14) or from a connection to the Internet, wireless or otherwise.

Figure 16:
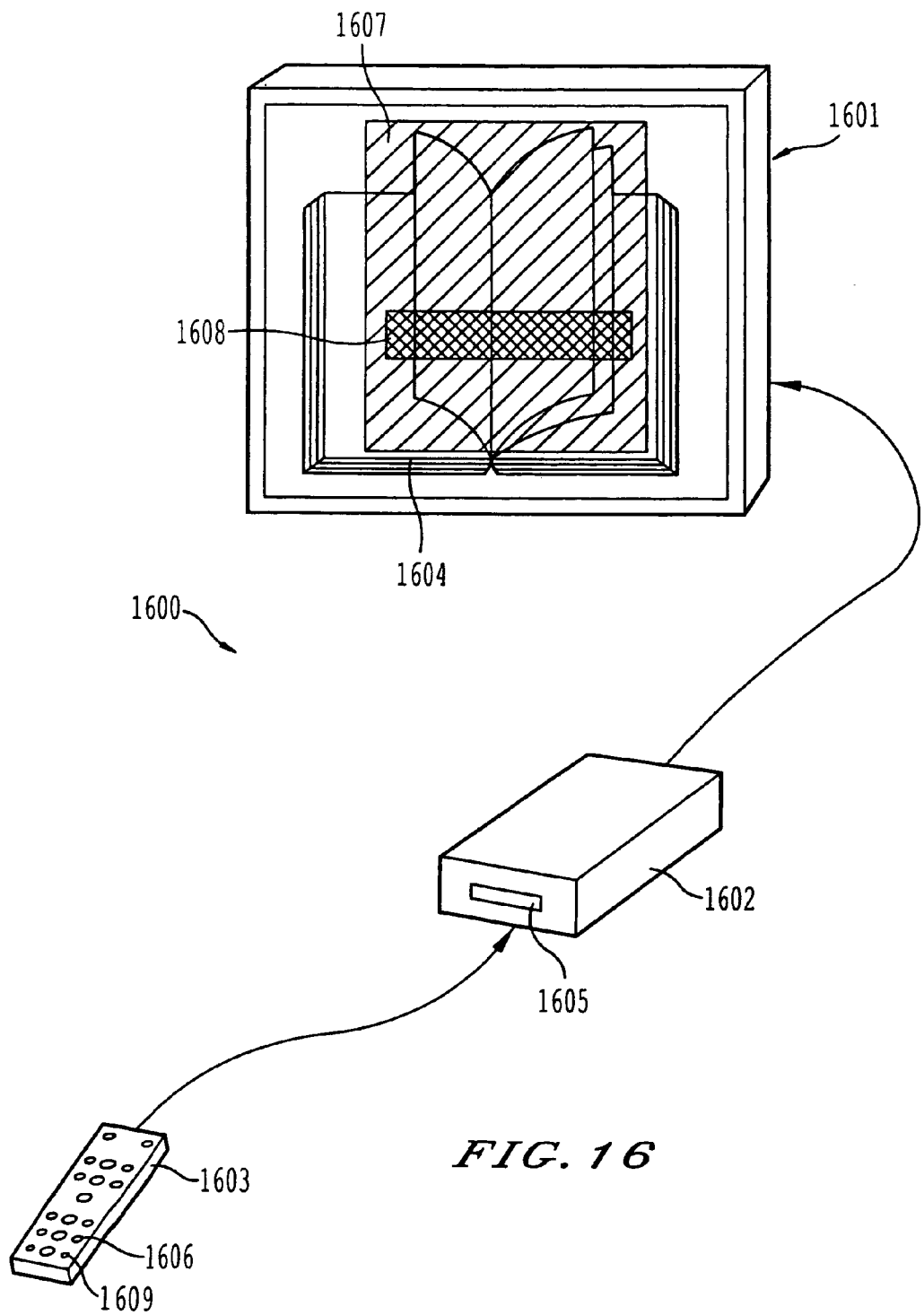
FIG. 16 is a front perspective view of a virtual book display and control system in which there are three main components: a display screen, a memory and control device and a controller, as well as a menu displayed on the display screen.

FIG. 16 depicts a system 1600 and a process in which a virtual book viewed on the screen can be transferred onto a CD or other kinds of memory medium 1605. In the process of viewing a virtual book 1604 on the screen 1601 using the memory and control device 1602, a button 1606 on the controller 1603 is pressed and a menu 1607 is popped up and a selection 1608 can be made to transfer the entire virtual book 1604 onto a CD or other media 1605. This process is different from that described above for transferring data directly onto the CD or other media 1605 using the COPY button 3025 (FIG. 13) or the COPY button 4006 (FIG. 14). In the above cases, the files are transferred as they are. In the process here depicted in FIG. 16, a virtual book 1604 is created and transferred onto the medium 1605 (CD or other media). What this means is, a recipient of the medium 1605 can insert the medium 1605 onto a computer, another memory and control device 1602, or other device that can read the medium 1605, and automatically the same virtual book 1604 will appear on the associated screen (e.g., 1601). In order to achieve this, one method is to transferred a viewer software along with the contents of the virtual book 1604 onto the medium 1605 so that it can re-create the virtual book 1604 on the associated screen (e.g., 1601) when the medium 1605 is read by whatever reading device.

Other than using a selection 1608 on a menu 1607 to activate the above virtual book transfer process, one can also use a specialized button 1609 on the controller 1603.

The controller 3001 depicted in FIG. 13, other than controlling the basic flipping actions depicted in FIG. 1 can also be used to control all the complex flipping actions depicted in FIGS. 3-12. This can be achieved by the buttons depicted in FIG. 13 on the controller 3001 or additional buttons added to the controller 3001. These buttons can be used by themselves or in combination with other buttons to launch these complex flipping actions (FIGS. 3-12).

Instead of using a controller (3001 in FIG. 13 or 203 in FIG. 2) to control all the basic flipping actions depicted in FIG. 1 and the complex flipping actions depicted in FIGS. 3-12 of a virtual book 204 displayed on a screen 201 (FIG. 2), a computer mouse or other control/input device can also be used.

FIG. 17-22 show one embodiment of a series of menus that appear on the screen 201 (FIG. 2) for effecting various actions on the system 200.

Figure 17:
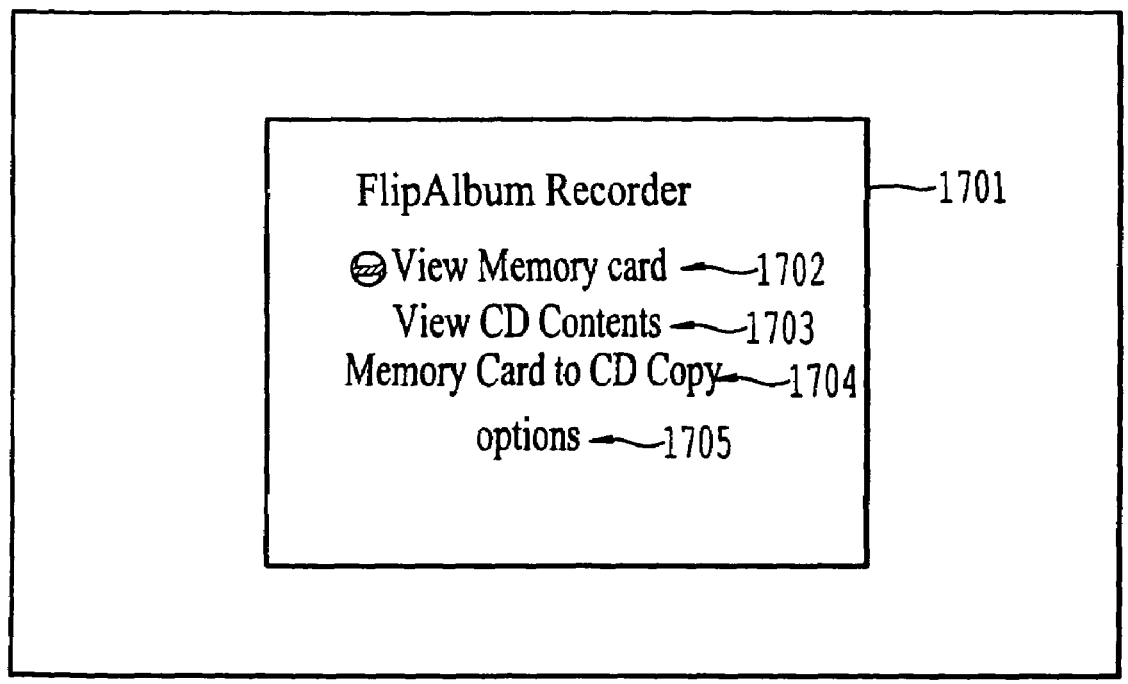
FIG. 17 is the top level menu of a virtual book system showing selections for viewing from various memory sources and for activating memory to memory copy.

FIG. 17 depicts the menu 1701 when the system 200 is first started. The selections include View Memory Card 1702, View CD Contents 1703, Memory Card to CD Copy 1704 and Options 1705.

Figure 18:
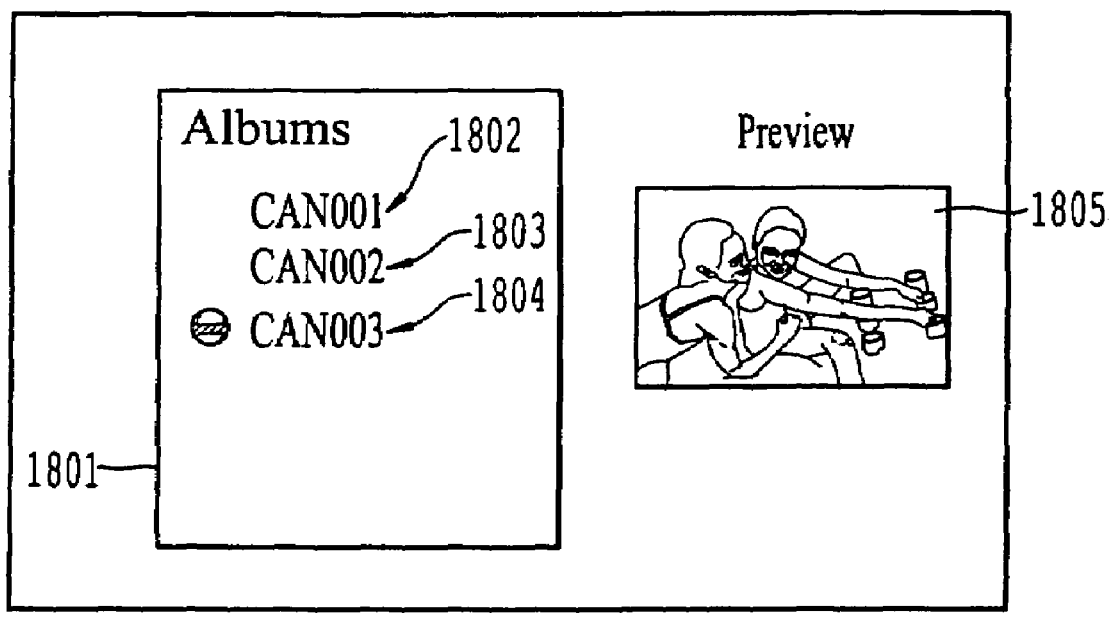

FIG. 18 shows the display on the screen 201 with a menu 1801 when View Memory Card 1702 in FIG. 17 is selected. It shows that there are three folders 1802, 1803, and 1804 on the memory card 4003 (FIG. 14) and the currently selected folder is 1802 CAN001. The Preview 1805 shows a part of the contents of the selected folder 1802 CAN001.

Figure 19:
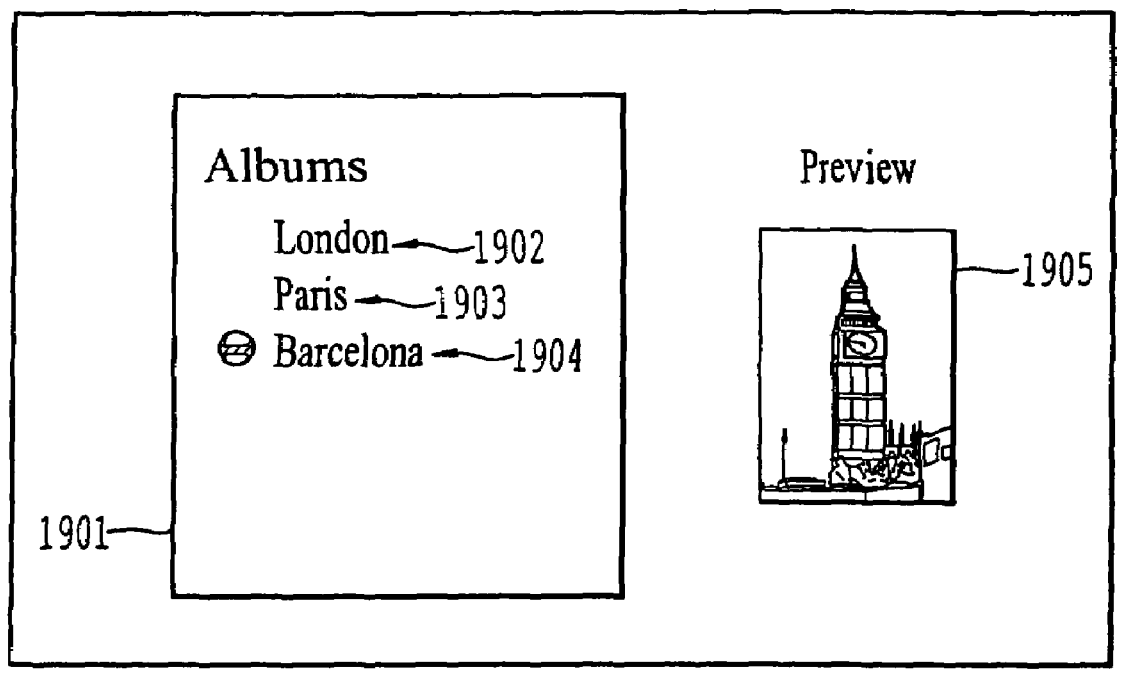

FIG. 19 shows the display on the screen 201 with a menu 1901 when View CD Contents 1703 in FIG. 17 is selected. It shows that there are three folders 1902, 1903, and 1904 on the memory drive (e.g., CD Drive) 4002 (FIG. 14) and the currently selected folder is 1902 London. The Preview 1905 shows a part of the contents of the selected folder 1902 London.

On the menu 1701 in FIG. 17, if the item Memory Card to CD Copy 1704 is selected, all the contents of the memory card 4003 will be copied into the CD (or other writable medium) in the memory drive 4002. This effect can also be achieved by pressing the COPY button 4006 on the memory and control device 4001 (FIG. 14). In general, the source of data to be copied onto a CD (or other writable medium) in the memory drive 4002 can come from either the memory card 4003 or other memory medium connected to the memory and control device 4001 through a USB or other connection or. The source of data can also come from the Internet through a connection to the Internet.

On the menu 1701 in FIG. 17, if the item Options 1705 is selected, the Options menu 2001 (FIG. 20) will appear in which one can select to set various parameters such as Sound Effects, Album Music, Album Theme, Memory Card, Compact Disc, and Autoplay Interval.

Figure 21:
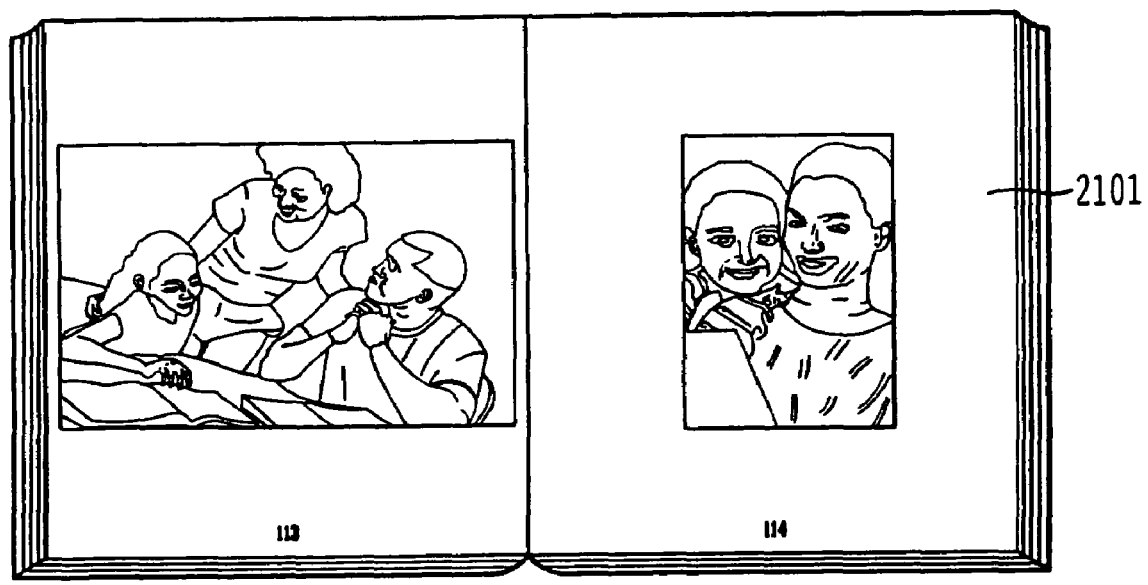
FIG. 21 is a front perspective view of a virtual book displayed on a display screen of the main system.

On the menu 1801 depicted in FIG. 18, if the current selected folder is, say, 1802 CAN001, and the OK button 3017 on the controller 3001 (FIG. 13) is pressed, a photo album/virtual book 2101 based on the contents of the folder 1802 CAN001 is created as shown in FIG. 21.

On the menu 1901 depicted in FIG. 19, if the current selected folder is, say, 1902 London, and the OK button 3017 on the controller 3001 (FIG. 13) is pressed, a photo album/virtual book 2101 based on the contents of the folder 1802 CAN001 is created as shown in FIG. 21.

Figure 22:
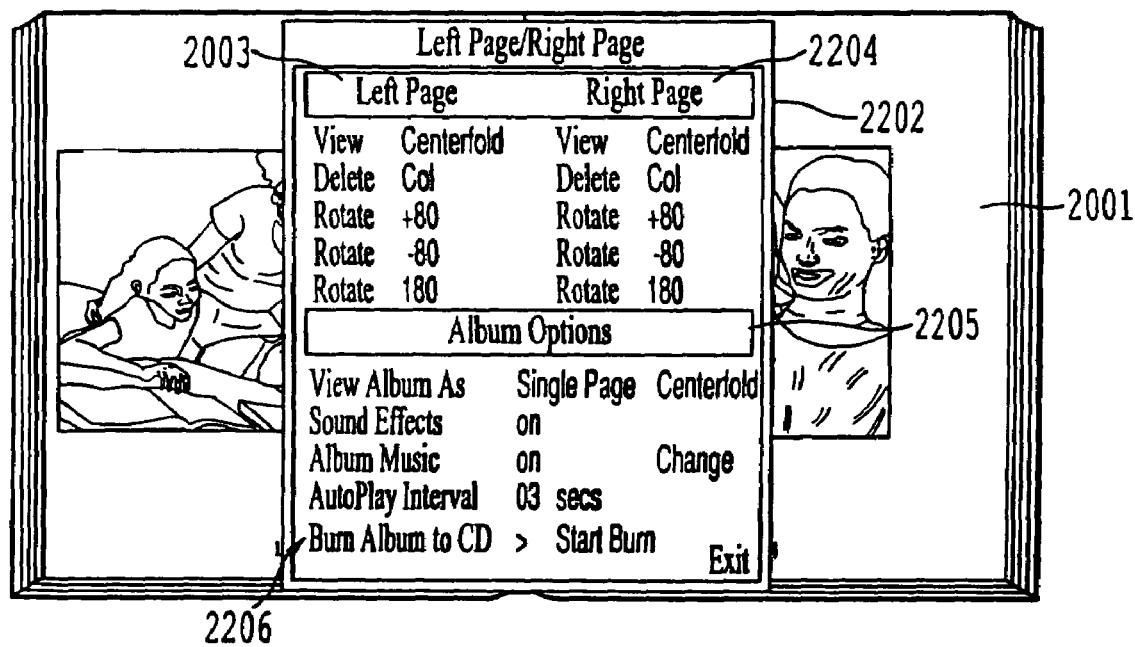
FIG. 22 is a menu superimposed on the front perspective view of a virtual book displayed on a display screen of the main system, showing various selections including the writing of a virtual book onto a memory medium.

As one is viewing the photo album/virtual book 2101 (FIG. 21), and the MENU button 3022 on the controller 3001 (FIG. 13) is pressed, a menu 2202 appears on the screen on top of the photo album/virtual book 2101 as depicted in FIG. 22. There are effects that can be applied to the photos or the contents on the left and right pages. The actions such as Delete, Rotate, and other editing functions can be applied to the left page contents using the Left Page selection 2203 and similarly for the contents on the right page using the Right Page selection 2204. There are other Album Options 2205 that can be selected including Sound Effects, Album Music, etc. The Burn Album to CD option 2206 in this menu 2202 allows the entire photo album/virtual book to be burned onto the medium (e.g., a Compact Disc, CD) in the memory drive 4002 (FIG. 14). When the Burn Album to CD command 2206 is activated, one method of the photo album/virtual book transfer to the memory medium (e.g., a CD) in the memory drive 4002 is such that should someone later insert the memory medium (e.g., the CD) into a memory drive either in a computer system, in another one of the system 200 (FIG. 2) or other systems configured to read from the memory medium, an entire photo album/virtual book will appear on the screen of any of these systems showing the same contents organized in the same manner as that shown on the screen 201 (i.e., the virtual book 2101). To achieve this, it normally entails the writing of a viewer software onto the memory medium together with the contents to be transferred onto the medium or CD. To make the viewing experience seamless, this viewer software can be made to auto-launch when the medium or CD is inserted into the memory drive of the recipient system.

When the user is on the menu 2001 (FIG. 20), he/she can elect to change the Album Music 2002 or Album Theme 2003. When any of these items is selected, they will be prompted to insert a memory medium into the memory card 4003 or the memory drive 4002 (FIG. 14) which contains either music or picture files. They can select one or more of these files to change the Album Music (the music that is played and accompanies the viewing of a photo album/virtual book 2101) or the Album Theme (which may include front cover, page, back cover, and other graphics on the photo album or virtual book).

Figure 23:
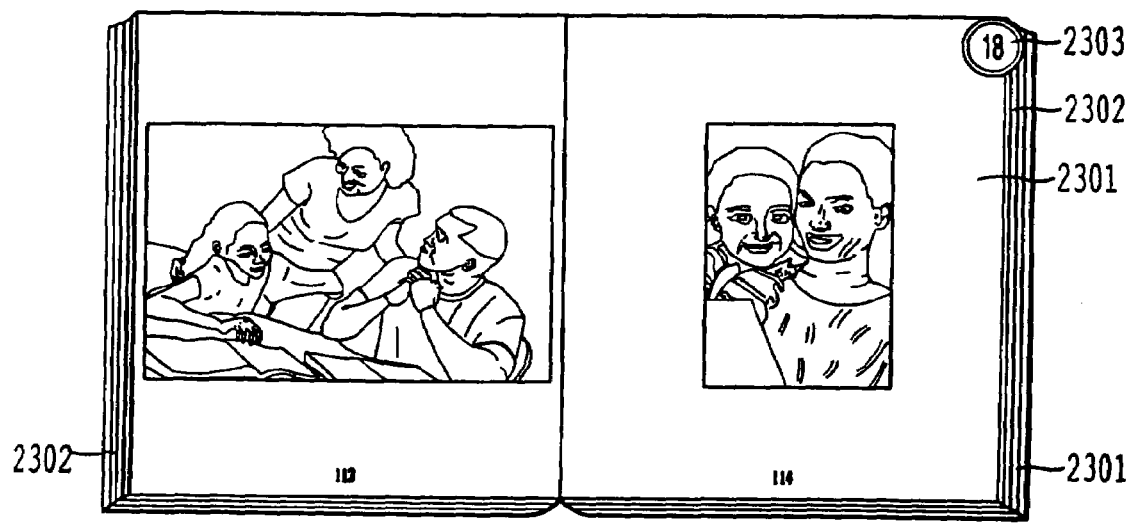
FIG. 23 is a front perspective view of a virtual book displayed on a display screen of the main system with a jump cursor being indicated.

When the user is using the controller 3001 (FIG. 13) and the button Thickness Right 3020 is pressed while viewing a virtual book 2101 (FIG. 23), a jump cursor 2302 appears on the right side thickness 2301 as shown in FIG. 23. Now, if the user presses the LEFT 3015 or RIGHT 3016 button (FIG. 13), the jump cursor will move to the left or right respectively to select a desired page. A number 2303 associated with the jump cursor 2302 may be displayed to show the page number of the selected page. The jump cursor may be later used for jumping to the selected/desired page. For example, when the jump cursor is positioned on a particular selected page and when the OK 3017 button (FIG. 13) is pressed, the virtual book 2101 will flipped to the selected page, with a representation of the pages skipped over in the form of an animation of a thick collection of pages moving across the screen as depicted in FIG. 1B, the thickness of the collection of pages being proportional to the number of pages skipped over. Correspondingly, a jump cursor can be displayed on the left thickness 2305 of the virtual book 2101 and controlled and used similarly.

Figure 20:
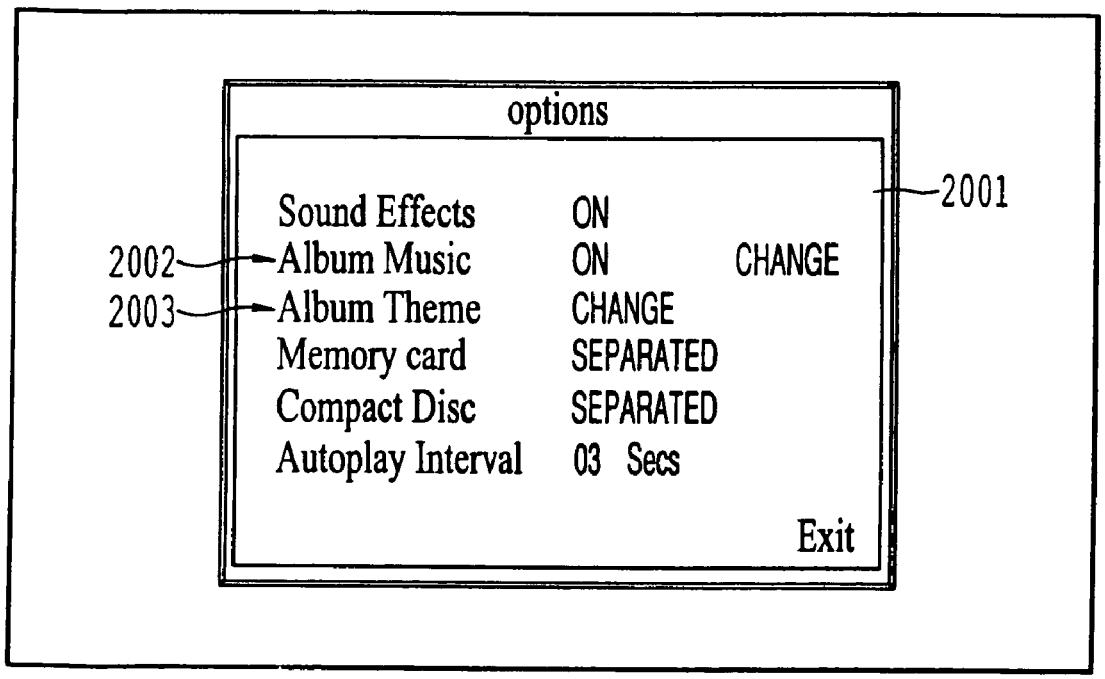
FIG. 20 is a menu for setting system parameters.

All the control inputs in FIGS. 22, such as the one-button Burn Album to CD option 2206 on the menu 2202, all the actions on the left page 2203, on the right page 2204 and the other Album Options 2204 on the menu 2202, all the selections View Memory Card 1702, View CD Contents 1703, Memory Card to CD Copy 1704 and Options 1705 on menu 1701 (FIG. 17), all the selections on menus 1801, 1901, and 2001 in FIGS. 18-20, and all the basic and complex flipping actions listed in FIG. 12 can also be made available as specialized buttons on the memory and control device 202 or on the remote controller 203 (FIG. 2).

The memory media on the memory and control device 4001 (FIG. 14) such as the memory card 4003 and the memory drive 4002 that the system 200 (FIG. 2) write to or read from can also be resident in another physical device outside the memory control device 4001 and connected to the memory and control device 4001 through wired connection, wireless connections, or through the Internet.

Each of these embodiments may be configured to display the virtual book or comparable information on a computer, a regular or widescreen television (TV), or a regular or widescreen high definition television (HDTV) and/or to interface with a CD-R, CD-RW, a DVD, or a similar optical/non-optical portable large volume storage disk or non-disk medium.

While particular embodiments of the present invention have been illustrated and described, it will be appreciated that numerous changes and modifications will occur to those skilled in the art, and it is intended that the appended claims cover all those changes and modifications which fall within the spirit and scope of the present invention.

What is claimed:

1. A method for controlling and browsing a virtual book, comprising:
one of accessing information relating to an electronic book from a removable memory medium and accessing information relating to an electronic book through one of a wired connection, a wireless connection, and Internet;
accessing said information via a memory and control device;
displaying information on two pages of said electronic book;
displaying a left and a right side book thickness, said left and right side book thicknesses corresponding to a respective amount of information within said electronic book before and after said displayed information;
displaying a plurality of pages simultaneously flipping in a first direction;
controlling a virtual flipping through said electronic book with a wireless remote control device and said memory and control device, said wireless remote control device physically separate from and in communication with the memory and control device;
stopping the flipping of some of the plurality of pages simultaneously flipping; and
displaying said stopped some of the plurality of pages flipping in an opposite direction from said first direction while displaying a remainder of said plurality of pages simultaneously flipping in said first direction.

2. The method of claim 1, further comprising:
displaying one of a page-bookmark, an annotation bookmark, a finger bookmark, and a keyword bookmark; and
displaying an Internet Universal Resource Locator field.

3. The method of claim 2, further comprising:
jumping to a selected page by one of selecting said page-bookmark, selecting said annotation bookmark, selecting said finger bookmark, selecting said keyword bookmark and activating one of a left and a right jump cursor.

4. The method of claim 3, wherein said displaying the plurality of pages comprises:
displaying a first collection of pages flipping between a current page and a jumped-to-page, a thickness of said first collection of pages being proportional to a number of pages between the current page and the jumped-to-page.

5. The method of claim 1, further comprising:
displaying one of a left and a right jump cursor.

6. The method of claim 5, further comprising:
displaying a page number, said page number corresponding to a page selected by said one of a left and a right jump cursor.

7. The method of claim 1, further comprising:
controlling said displaying information, said displaying the left and the right side book thickness, and said displaying a plurality of pages simultaneously flipping with the wireless remote control device.

8. The method of claim 7, wherein said wireless remote control device comprises at least one of:
a computer;
a keyboard;
a pointing device; and
a remote control device having buttons on a first side and on an opposing side and having at least one pressure sensitive thumb pad.

9. The method of claim 8, further comprising:
controlling said virtual flipping through said electronic book with another control device;
selecting a menu for display with said another control device;
selecting an item displayed on said menu with said another control device; and
one of ejecting a tangible memory medium from a memory device or deleting information from said memory device with said another control device.

10. The method of claim 7, further comprising:
displaying a menu.

11. The method of claim 7, further comprising:
one of
viewing contents of a memory card,
viewing contents of a CD or DVD,
viewing contents of one or more storage medium,
copying contents from the memory card to the CD or DVD,
copying contents from the CD or DVD to the memory card,
copying contents from a first storage medium to a second storage medium,
copying contents from the control device to the memory card, the one or more storage medium, or the CD or DVD,
copying contents from one of the memory card, one or more storage medium, CD or DVD to the control device, and
applying optional features to one of an image, text, an audio object, a video object, a multimedia object, a page, and the virtual book.

12. The method of claim 11, further comprising:
viewing said contents of the memory card, the one or more storage medium, or the CD or DVD as thumbnails, as a slide show, or as a flipping book.

13. The method of claim 12, further comprising:
selecting a folder to be previewed.

14. The method of claim 11, further comprising:
copying said contents of one of the memory card, the CD or DVD, or the one or more storage medium into a writable medium, said writable medium connected to said control device directly or via a network.

15. The method of claim 11, further comprising:
copying one of images, text, audio files, video files, and multimedia objects from at least one of the Internet and an intranet.

16. The method of claim 11, wherein said applying comprises:
selecting one of a sound effect, an album music, an album theme, a memory card, a compact disc, and an autoplay interval.

17. The method of claim 11, further comprising:
applying visual effects to an image.

18. The method of claim 11, further comprising:
one of deleting, rotating, and editing an image on a page.

19. The method of claim 11, further comprising:
one of applying sound effects and applying music to one of an image and a page.

20. The method of claim 11, further comprising:
copying an entire virtual book to a writable medium, said writable medium connected to said control device directly or via a network.

21. The method of claim 11, wherein at least one of said steps of viewing contents of a memory card, viewing contents of one or more storage medium, viewing contents of a CD or DVD, copying contents from the memory card to the CD or DVD, copying contents from the CD or DVD to the memory card, copying contents from a first storage medium to a second storage medium, copying contents from the control device to the memory card, the one or more storage medium, or the CD or DVD, copying said contents from the memory card, the one or more storage medium, or the CD or DVD to the control device, and applying optional features to an image, text, an audio object, a video object, a multimedia object, a page, or the virtual book comprises:
   one-button operations.

22. The method of claim 11, said step of copying contents from the control device to the memory card, the one or more storage medium, or the CD or DVD comprises:
   installing viewing software on the respective memory card, one or more storage medium, CD or DVD from said control device.

23. The method of claim 1, wherein said displaying the plurality of pages comprises:
   displaying a plurality of pages flipping, individually or in tandem, to a selected page; and
   adjusting the left and right side thickness to correspond to a jump to said selected page.

24. The method of claim 23, further comprising:
   freezing one or more flipping pages in a partially flipped position.

25. The method of claim 24, further comprising:
   controllably flipping a frozen one or more pages.

26. The method of claim 24, further comprising:
   unfreezing some or all pages frozen by said freezing.

27. The method of claim 1, further comprising:
   adjusting a speed of displayed movement through said electronic book; and
   displaying an increased number of pages flipped, said increased number corresponding to the adjusted speed.

28. The method of claim 1, further comprising:
   displaying one of a coarse and fine thickness indication.

29. The method of claim 1, further comprising:
   displaying a stationary left and right page while displaying the plurality of pages simultaneously flipping across from a first side to a second side, said plurality of pages simultaneously flipping being located between said stationary left and right page.

30. The method of claim 1, further comprising:
   adjusting a book browsing speed;
   displaying more or less pages simultaneously flipping in correspondence to said adjusted book browsing speed; and
   adjusting the left and right side thickness in proportion to the direction of page flipping and said book browsing speed.

31. The method of claim 1, further comprising:
   stopping a subset of said plurality of pages simultaneously flipping; and
   displaying said subset flipping in said first direction while displaying a remainder of said plurality of pages simultaneously flipping in said opposite direction.

32. The method of claim 31, further comprising:
   stopping a flipping of a subset of said remainder of said plurality of pages; and
   displaying said stopped subset of said remainder of said plurality of pages flipping in said first direction while displaying a remainder of said remainder of said plurality of pages simultaneously flipping in said opposite direction.

33. The method of claim 1, wherein said controlling comprises:
   using at least one of a zoom button, a flipping direction button, a bookmark button, and a flip-to button on the wireless remote control device.

34. The method of claim 1, further comprising:
   deleting information from said memory device with said wireless remote control device.

35. The method of claim 1, further comprising:
   ejecting the removable memory medium from the memory and control device based upon a signal from said wireless remote control device.

36. A method for controlling and browsing a virtual book, comprising:
   one of accessing information relating to an electronic book from a removable memory medium and accessing information relating to an electronic book through one of a wired connection, a wireless connection, and Internet;
   accessing said information via a memory and control device;
   displaying information on two pages of said electronic book;
   displaying a left and a right side book thickness, said left and right side book thicknesses corresponding to a respective amount of information within said electronic book before and after said displayed information;
   displaying a plurality of pages flipping, individually or in tandem, across said electronic book to a selected page;
   controlling a virtual flipping through said electronic book with a wireless remote control device and said memory and control device, said wireless remote control device physically separate from and in communication with the memory and control device;
   adjusting the left and right side book thickness to correspond to a jump to said selected page;
   freezing one or more flipping pages in a partially flipped position;
   unfreezing some or all pages frozen by said freezing;
   displaying unfrozen pages flipping in a direction equal to a pre-freezing flipping direction;
   displaying unfrozen pages flipping in a direction opposite to a pre-freezing flipping direction; and
   displaying a first subset of unfrozen pages flipping in a direction equal to the pre-freezing flipping direction while displaying a second subset of unfrozen pages flipping in a direction opposite to the pre-freezing flipping direction.

37. A method for controlling and browsing a virtual book, comprising:
   one of accessing information relating to an electronic book from a removable memory medium and accessing information relating to an electronic book through one of a wired connection, a wireless connection, and Internet;
   accessing said information via a memory and control device;
   displaying information on two pages of said electronic book;
   displaying a left and a right side book thickness, said left and right side book thicknesses corresponding to a respective amount of information within said electronic book before and after said displayed information;

displaying one or more pages flipping, individually or in tandem, across said electronic book;

controlling a virtual flipping through said electronic book with a wireless remote control device and said memory and control device, said wireless remote control device physically separate from and in communication with the memory and control device;

displaying one of a page-bookmark, an annotation bookmark, a finger bookmark, and a keyword bookmark;

displaying an Internet Universal Resource Locator field;

jumping to a selected page by one of selecting said page-bookmark, selecting said annotation bookmark, selecting said finger bookmark, selecting said keyword bookmark and activating one of a left and a fight jump cursor;

jumping to a second selected page by one of selecting another one of said page-bookmark, said annotation bookmark, said finger bookmark, and said keyword bookmark and activating one of said left and a right jump cursor; and displaying a second collection of pages flipping between a current page and a second jumped-to-page, a thickness of said second collection of pages being proportional to a number of pages between a trailing edge page and the second jumped-to-page, wherein said jumping to a second selected page occurring while displaying a first collection of pages flipping between a current page and jumped-to-page.

38. A method for controlling and browsing a virtual book, comprising:

one of accessing information relating to an electronic book from a removable memory medium and accessing information relating to an electronic book through one of a wired connection, a wireless connection, and Internet;

accessing said information via a memory and control device;

displaying information on two pages of said electronic book;

displaying a left and a right side book thickness, said left and right side book thicknesses corresponding to a respective amount of information within said electronic book before and after said displayed information;

displaying one or more pages flipping, individually or in tandem, across said electronic book;

controlling a virtual flipping through said electronic book with a wireless remote control device and said memory and control device, said wireless remote control device physically separate from and in communication with the memory and control device;

controlling said displaying information, said displaying the left and the right side book thickness, and said displaying one or more pages flipping simultaneously with the wireless remote control device;

holding said one or more flipping pages stationary on a display; and moving said held one or more pages across the display by controlling a position control component of the wireless remote control device.

39. A method for controlling and browsing a virtual book, comprising:

one of accessing information relating to an electronic book from a removable memory medium and accessing information relating to an electronic book through one of a wired connection, a wireless connection, and Internet;

accessing said information via a memory and control device;

displaying information on two pages of said electronic book;

displaying a left and a right side book thickness, said left and right side book thicknesses corresponding to a respective amount of information within said electronic book before and after said displayed information;

displaying one or more pages flipping, individually or in tandem, across said electronic book;

controlling a virtual flipping through said electronic book with a wireless remote control device and said memory and control device, said wireless remote control device physically separate from and in communication with the memory and control device;

controlling said displaying information, said displaying the left and the right side book thickness, and said displaying one or more pages flipping simultaneously with the wireless remote control device;

picking up a first page or a first collection of pages from one of said right side book thickness and said left side book thickness;

collecting onto the picked-up first page or the picked-up first collection of pages a collection of additional pages into a first book subsection; and holding or flipping said first book subsection.

40. The method of claim 39, further comprising:

dropping at least one page from said first book subsection.

41. The method of claim 39, further comprising:

picking up a second single page or a second collection of pages with said control device to form a second book subsection; and forming a sub-book with said first and second book subsections.

42. The method of claim 41, further comprising:

dropping at least one page from at least one of said first and second collection of pages.

43. A method for controlling and browsing a virtual book, comprising:

one of accessing information relating to an electronic book from a removable memory medium and accessing information relating to an electronic book through one of a wired connection, a wireless connection, and Internet;

accessing said information via a memory and control device;

displaying information on two pages of said electronic book;

displaying a left and a right side book thickness, said left and right side book thicknesses corresponding to a respective amount of information within said electronic book before and after said displayed information;

displaying one or more pages flipping, individually or in tandem, across said electronic book;

controlling a virtual flipping through said electronic book with a wireless remote control device and said memory and control device, said wireless remote control device physically separate from and in communication with the memory and control device;

controlling said displaying information, said displaying the left and the right side book thickness, and said displaying one or more pages flipping simultaneously with the wireless remote control device;

picking up a first collection of one of one page and more than one page from one of said right side book thickness and said left side book thickness;

holding or flipping said first collection of pages.

44. The method of claim 43, further comprising:
dropping at least one page from said first collection of pages.

45. The method of claim 43, further comprising:
displaying one of a page-bookmark, an annotation bookmark, a finger bookmark, and a keyword bookmark; and
displaying an Internet Universal Resource Locator field.

46. The method of claim 45, further comprising:
jumping to a selected page by one of selecting said page-bookmark, selecting said annotation bookmark, selecting said finger bookmark, selecting said keyword bookmark and activating one of a left and a right jump cursor.

47. The method of claim 46, wherein said displaying the plurality of pages comprises:
displaying a first collection of pages flipping between a current page and a jumped-to-page, a thickness of said first collection of pages being proportional to a number of pages between the current page and the jumped-to-page.

48. The method of claim 43, further comprising:
displaying one of a left and a right jump cursor.

49. The method of claim 48, further comprising:
displaying a page number, said page number corresponding to a page selected by said one of a left and a right jump cursor.

50. The method of claim 43, further comprising:
controlling said displaying information, said displaying the left and the right side book thickness, and said displaying a plurality of pages simultaneously flipping with the wireless remote control device.

51. The method of claim 50, wherein said wireless remote control device comprises at least one of:
a computer;
a keyboard;
a pointing device; and
a remote control device having buttons on a first side and on an opposing side and having at least one pressure sensitive thumb pad.

52. The method of claim 50, further comprising:
displaying a menu.

53. The method of claim 50, further comprising:
one of
viewing contents of a memory card,
viewing contents of a CD or DVD,
viewing contents of one or more storage medium,
copying contents from the memory card to the CD or DVD,
copying contents from the CD or DVD to the memory card,
copying contents from a first storage medium to a second storage medium,
copying contents from the control device to the memory card, the one or more storage medium, or the CD or DVD,
copying contents from one of the memory card, one or more storage medium, CD or DVD to the control device, and
applying optional features to one of an image, text, an audio object, a video object, a multimedia object, a page, and the virtual book.

54. The method of claim 53, further comprising:
viewing said contents of the memory card, the one or more storage medium, or the CD or DVD as thumbnails, as a slide show, or as a flipping book.

55. The method of claim 54, further comprising:
selecting a folder to be previewed.

56. The method of claim 53, further comprising:
copying said contents of one of the memory card, the CD or DVD, or the one or more storage medium into a writable medium, said writable medium connected to said control device directly or via a network.

57. The method of claim 53, further comprising:
copying one of images, text, audio files, video files, and multimedia objects from at least one of the Internet and an intranet.

58. The method of claim 53, wherein said-applying comprises:
selecting one of a sound effect, an album music, an album theme, a memory card, a compact disc, and an autoplay interval.

59. The method of claim 53, further comprising:
applying visual effects to an image.

60. The method of claim 53, further comprising:
one of deleting, rotating, and editing an image on a page.

61. The method of claim 53, further comprising:
one of applying sound effects and applying music to one of an image and a page.

62. The method of claim 53, further comprising:
copying an entire virtual book to a writable medium, said writable medium connected to said control device directly or via a network.

63. The method of claim 53, wherein at least one of said steps of viewing contents of a memory card, viewing contents of one or more storage medium, viewing contents of a CD or DVD, copying contents from the memory card to the CD or DVD, copying contents from the CD or DVD to the memory card, copying contents from a first storage medium to a second storage medium, copying contents from the control device to the memory card, the one or more storage medium, or the CD or DVD, copying said contents from the memory card, the one or more storage medium, or the CD or DVD to the control device, and applying optional features to an image, text, an audio object, a video object, a multimedia object, a page, or the virtual book comprises:
one-button operations.

64. The method of claim 53, said step of copying contents from the control device to the memory card, the one or more storage medium, or the CD or DVD comprises:
installing viewing software on the respective memory card, one or more storage medium, CD or DVD from said control device.

65. The method of claim 43, wherein said displaying the plurality of pages comprises:
displaying a plurality of pages flipping, individually or in tandem, to a selected page; and
adjusting the left and right side thickness to correspond to a jump to said selected page.

66. The method of claim 65, further comprising:
freezing one or more flipping pages in a partially flipped position.

67. The method of claim 66, further comprising:
controllably flipping a frozen one or more pages.

68. The method of claim 66, further comprising:
unfreezing some or all page frozen by said freezing.

69. The method of claim 43, further comprising:
adjusting a speed of displayed movement through said electronic book; and
displaying an increased number of pages flipped, said increased number corresponding to the adjusted speed.

70. The method of claim 43, further comprising;
displaying one of a coarse and fine thickness indication.

71. The method of claim 43, further comprising:
displaying a stationary left and right page while displaying the plurality of pages simultaneously flipping across from a first side to a second, said plurality of pages simultaneously flipping being located between said stationary left and right page.

72. The method of claim 43, further comprising;
adjusting a book browsing speed;
displaying more or less pages simultaneously flipping in correspondence to said adjusted book browsing speed; and
adjusting the left and right side thickness in proportion to the direction of page flipping and said book browsing speed.

73. A system for displaying and editing an electronic book, comprising;
a display screen;
a memory and control device;
a controller physically separated from said memory and control device, and configured to
one of access information relating to the electronic book from a removable memory medium and access information relating to the electronic book through one of a wired connection, a wireless connection, and Internet,
access said information via said memory and control device,
display information on two pages of said electronic book,
display a left and a right side book thickness, said left and right side book thicknesses corresponding to a respective amount of information within said electronic book before and after said displayed information,
display a plurality of pages simultaneously flipping in a first direction,
control a virtual flipping through said electronic book,
stop the flipping of some of the plurality of pages simultaneously flipping, and
display said stopped some of the plurality of pages flipping in an opposite direction from said first direction while displaying a remainder of said plurality of pages simultaneously flipping in said first direction.

74. The system of claim 73, wherein said display screen comprises one of:
a computer screen, and
a TV screen.

75. The system of claim 73, wherein said TV screen comprises one of a:
an analog display screen;
a digital display screen;
a wide-aspect display screen;
a non-wide-aspect display screen;
an NTSC display screen; and
a PAL display screen or any other kind of display screen.

76. The system of claim 73, wherein the controller comprises one of:
a pointing device;
a keyboard,
a wireless remote controller, and
a remote controller having buttons on a first side and on an opposing side, and having at least one pressure sensitive thumb pad.

77. The system of claim 73, wherein at least one of said controller and said memory and control device comprises at least one of:
a STANDBY button;
a CLOSE button;
a ZOOM-LEFT button;
a ZOOM-RIGHT button an UP button;
a DOWN button;
an OK button;
a LEFT button;
a RIGHT button;
a LEFT THICKNESS button;
a RIGHT THICKNESS button;
a BOOKMARK button;
a MENU button;
an AUTOFLIP button;
a FLIPTO button;
a COPY button;
an EJECT button; and
a DELETE button.

78. The system of claim 77, wherein at least one of said controller and said memory and control device includes a button that operates in concert with a displayed menu.

79. The system of claim 73, wherein at least one of said controller and said memory and control device is configured to initiate a command that includes at least one of
a direction of movement command;
a speed of movement command;
a select-to-jump-to-a-specified-point-in-a-document command;
a jump-to-a-specified-point-in-a-document command;
a permanent-bookmarking command;
a finger-bookmarking command;
a launch-a-single-flipping-page command;
a-launch-multiple-flipping-pages-at-a-specific-interval command;
a reverse-direction-of-a-single-last-trailing-page command;
a reverse-direction-of-multiple-last-trailing-pages command;
a reverse-direction-of-a-selected-group-of-flipping-pages command;
a freeze-at-least-one-flipping-pages-in-mid-flip command;
an-unfreeze-frozen-pages-and-let-pages-continue-to-flip-in-directions-prior to-freezing command;
an unfreeze-frozen-pages-and-let-pages-all-flip-in-a-same-direction command;
an unfreeze-frozen-pages-and-some-pages-flip-to-a-left-side-and-some-to-a-right-side-of-book command;
an unfreeze-frozen-pages-and-let-a-subgroup-of-pages-flip-in-different-directions command;
a jump-and-make-a-thick-collection-of-pages-flip-together command;
a launch-flipping-pages-while-a-thick-collection-of-pages-is-flipping command;
a launch-at-least-one-other-thick-collections-of-pages-while-other-pages-are-flipping command;
a select-to-hold-a-page command;
a move-a-held-single-page-in-a-selected-direction-at-a-selected-speed command;
a select-to-hold-a-thick-collection-of-pages command;
a move-a-held-single-thick-collection-of-pages-in-a-selected-direction-and-at-a-selected-speed command;
a select-to-hold-at-least-one-of-at-least-two-pages-and-a-thick-collection-of-pages command;
a move-at-least-one-of-a-held-pages-and-a-thick-collection-of-pages-in-a-selected-direction-and-at-a-selected-speed command;
a hold-a-single-page-in-mid-flip-and-collect-other-pages-that-flip-onto-the-single-page-in-mid-flip command;

a hold-a-single-thick-collection-of-pages-in-mid-flip-and-collect-other-pages-that-flip-onto-the-single-thick-collection-of-pages-in -mid-flip command;

a hold-at-least-one-of-a-single-page-and-a-thick-collection-of-pages-in-mid-flip-and -execute-at-least-one-of-the-set-of-page-flipping-commands-between-the-at-least-one-of-a -single-page-and-a-thick-collection-of-pages-in-mid-flip-and-a-thickness-of-a-side-of-a-book-command; and a hold-at-least-one-of-two-pages-and-a-thick-collection-of-pages-in-mid-flip-and -execute-at-least-one-of-the-set-of-page-flipping-commands-between-the-at-least-one-of-two -pages-and-a-thick-collection-of-pages-in-mid-flip command.

80. The method of claim 79, wherein said command is executed via a menu.

81. The system of claim 73, wherein said memory and control device comprises:
a computer.

82. The system of claim 73, wherein said memory and control device comprises at least one of:
a memory integrated with said computer;
a portable memory module;
a memory card;
a memory stick; and
a compact disk.

83. The system of claim 73, further comprising one of:
a CD-R;
a CD-RW;
a DVD;
a portable optical large volume storage disk;
a portable large volume non-optical storage medium; and
a storage medium resident in said memory and control device or connected to the memory and control device through a wired or wireless connection or through the Internet.

84. The system of claim 73, wherein said controller is further configured to delete information from said memory and control device.

85. An apparatus configured to control an electronic book, comprising:
a controller configured to
one of access information relating to the electronic book from a removable memory medium and access information relating to the electronic book through one of a wired connection, a wireless connection, and Internet,
access said information,
display information on two pages of said electronic book,
display a left and a right side book thickness, said left and right side book thicknesses corresponding to a respective amount of information within said electronic book before and after said displayed information,
display a plurality of pages simultaneously flipping in a first direction,
control a virtual flipping through said electronic book,
stop the flipping of some of the plurality of pages simultaneously flipping, and
display said stopped some of the plurality of pages flipping in an opposite direction from said first direction while displaying a remainder of said plurality of pages simultaneously flipping in said first direction.

86. A computer readable storage medium encoded with instructions, which when executed by processor causes the processor to implement a method for controlling and browsing a virtual book, comprising:
one of accessing information relating to an electronic book from a removable memory medium and accessing information relating to an electronic book through one of a wired connection, a wireless connection, and Internet;
accessing said information via a memory and control device;
displaying information on two pages of said electronic book;
displaying a left and a right side book thickness, said left and right side book thicknesses corresponding to a respective amount of information within said electronic book before and after said displayed information;
displaying a plurality of pages simultaneously flipping in a first direction;
controlling a virtual flipping through said electronic book with a wireless remote control device and said memory and control device, said wireless remote control device physically separate from and in communication with the memory and control device;
stopping the flipping of some of the plurality of pages simultaneously flipping; and
displaying said stopped some of the plurality of pages flipping in an opposite direction from said first direction while displaying a remainder of said plurality of pages simultaneously flipping in said first direction.

* * * * *